United States Patent
Gomyo et al.

(10) Patent No.: US 10,281,736 B2
(45) Date of Patent: May 7, 2019

(54) LENS DRIVING DEVICE, AND MANUFACTURING METHOD OF LENS DRIVING DEVICE

(71) Applicant: ALPS ALPINE CO., LTD., Tokyo (JP)

(72) Inventors: Hideyuki Gomyo, Miyagi-ken (JP); Akiyoshi Sarudate, Miyagi-ken (JP); Yuji Takahashi, Miyagi-ken (JP); Yuya Sakurada, Miyagi-ken (JP)

(73) Assignee: ALPS ALPINE CO., LTD., Tokyo (JP)

( * ) Notice: Subject to any disclaimer, the term of this patent is extended or adjusted under 35 U.S.C. 154(b) by 22 days.

(21) Appl. No.: 15/661,259

(22) Filed: Jul. 27, 2017

(65) Prior Publication Data
US 2018/0031858 A1    Feb. 1, 2018

(30) Foreign Application Priority Data

Jul. 29, 2016    (JP) .................. 2016-149088

(51) Int. Cl.
| | |
|---|---|
| *G02B 27/64* | (2006.01) |
| *G02B 7/09* | (2006.01) |
| *G03B 5/04* | (2006.01) |
| *G03B 3/10* | (2006.01) |
| *G03B 5/00* | (2006.01) |

(52) U.S. Cl.
CPC ............ *G02B 27/646* (2013.01); *G02B 7/09* (2013.01); *G03B 3/10* (2013.01); *G03B 5/00* (2013.01); *G03B 5/04* (2013.01); *G03B 2205/0015* (2013.01); *G03B 2205/0053* (2013.01)

(58) Field of Classification Search
CPC ............... G02B 7/00; G02B 7/02; G02B 7/04
USPC .................. 359/811, 819, 821, 823, 824
See application file for complete search history.

(56) References Cited

U.S. PATENT DOCUMENTS

| | | | |
|---|---|---|---|
| 7,881,598 B1* | 2/2011 | Wu ................... | G03B 17/00 |
| | | | 396/133 |
| 2011/0176046 A1* | 7/2011 | Hu ................... | G02B 7/08 |
| | | | 348/335 |
| 2012/0154614 A1* | 6/2012 | Moriya ............. | G03B 3/10 |
| | | | 348/208.5 |

FOREIGN PATENT DOCUMENTS

JP    2014-085624 A    5/2014

* cited by examiner

*Primary Examiner* — Robert E. Tallman
(74) *Attorney, Agent, or Firm* — Brinks Gilson & Lione

(57) ABSTRACT

A lens driving device includes a movable unit including a lens holding member, and a suspension wire configured to support the movable unit movably in a direction intersecting an optical axis direction. The movable unit has an upper leaf spring and a fixing member. The upper leaf spring has a first portion fixed to the lens holding member, a second portion fixed to the fixing member, a wire fixing portion soldered to the suspension wire, and a linking portion provided linking between the second portion and the wire fixing portion. The linking portion has two extending portions extending from two separate positions on the second portion toward the wire fixing portion side. A plate-shaped protruding portion protruding inwards from the wire fixing portion is provided between the two extending portions.

13 Claims, 21 Drawing Sheets

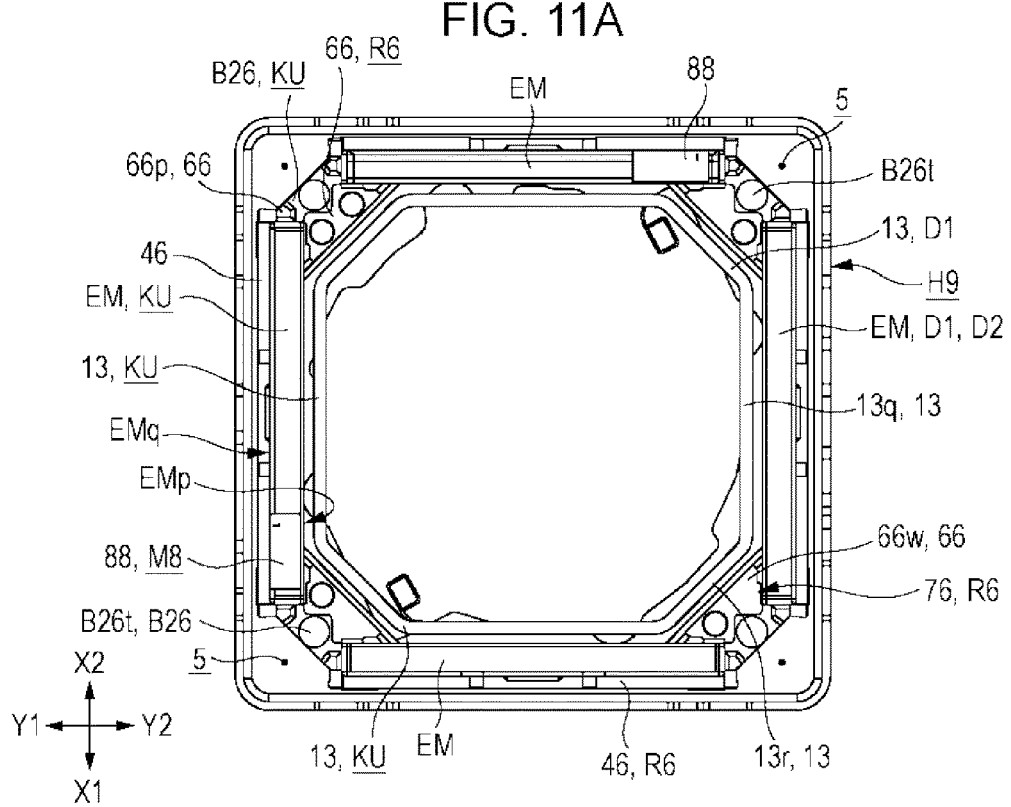
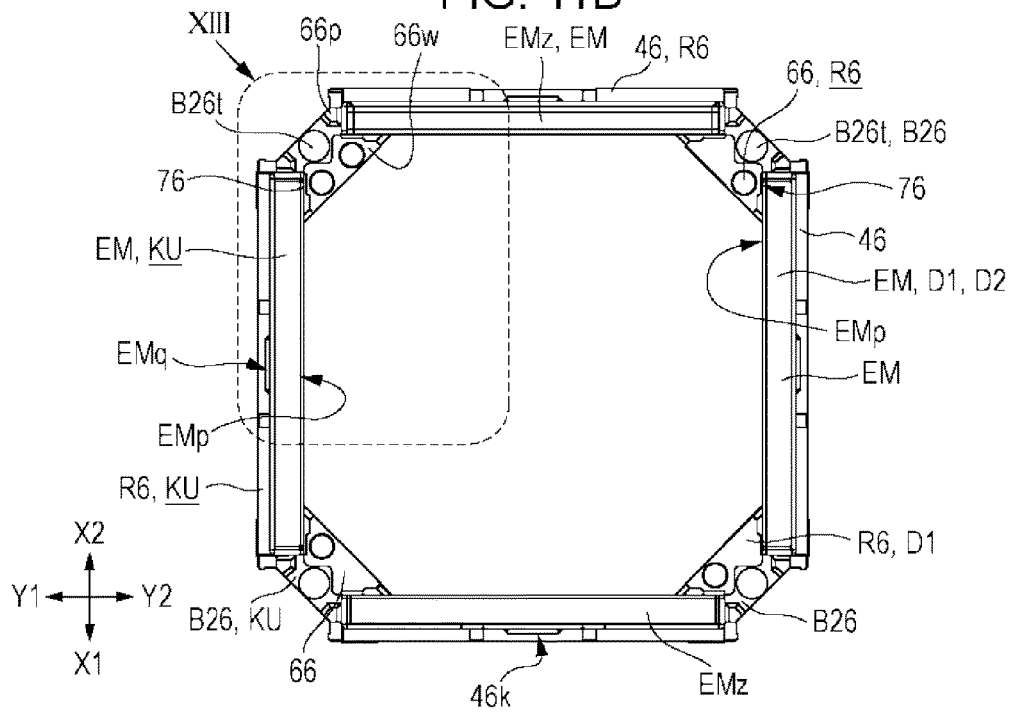

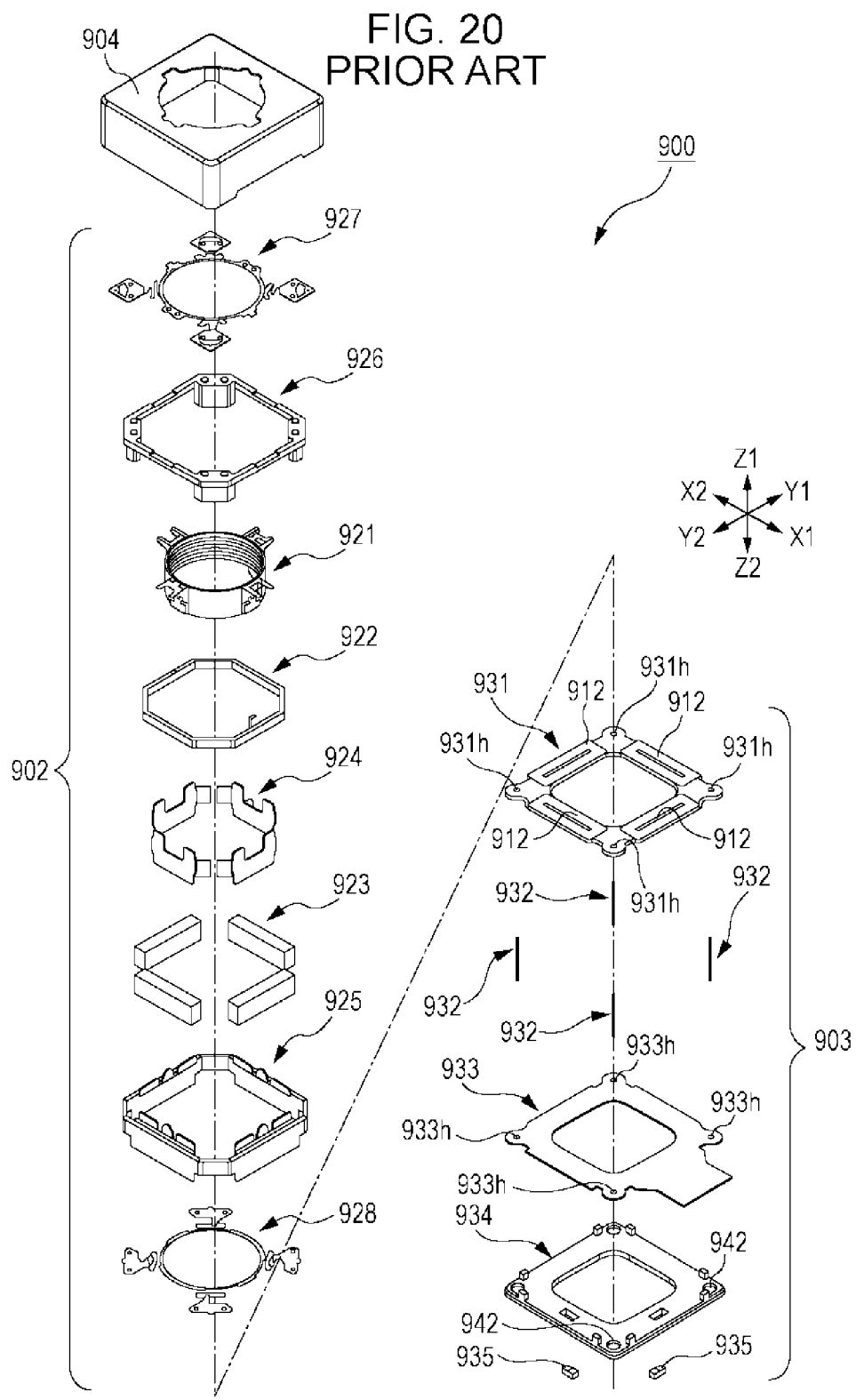

LENS DRIVING DEVICE, AND MANUFACTURING METHOD OF LENS DRIVING DEVICE

CLAIM OF PRIORITY

This application claims benefit of priority to Japanese Patent Application No. 2016-149088 filed on Jul. 29, 2016, which is hereby incorporated by reference in its entirety.

BACKGROUND

1. Field of the Disclosure

The present disclosure relates to a lens driving device that can move a lens, installed in a mobile device having a camera, for example, in the optical axis direction, and more particularly relates to a lens driving device that can move the lens in a direction that intersects the optical axis direction.

2. Description of the Related Art

It has become commonplace in recent years for small-sized cameras to be installed in mobile devices such as cellular phones. Lens driving devices, which are a principal part of the camera mechanisms installed in such small mobile devices, are used in automatic focusing for shooting still images or moving images. It has been required of such lens driving devices to be small and to have a function of accurately driving a lens member (a lens barrel to which a lens is mounted). An arrangement is known where a magnetic circuit for driving a lens holder that holds the lends member (lens holding member) is provided around the lens holder, as a lens driving device that satisfies this requirement.

Recently, attempts are being vigorously pursued to include an image stabilization mechanism used in common cameras in these small-sized cameras, in order to improve the image quality of images taken by these small-sized cameras. There are various systems by which image stabilization mechanisms work, examples including a system where the lens is moved, a lens where an autofocus driving device is moved, and a system where an imaging device (e.g., a charge coupled device (CCD)) is moved. A lens driving device that incorporates, of the aforementioned image stabilization mechanisms, the system where the lens is moved, has been proposed.

As a conventional example, Japanese Unexamined Patent Application Publication No. 2014-85624 proposes a lens driving device 900 such as illustrated in FIGS. 20 through 21B, as the above-described lens driving device. FIG. 20 is a disassembled perspective view of the lens driving device 900 according to the conventional example. FIGS. 21A and 21B are diagrams for describing the lens driving device 900 according to the conventional example. FIG. 21A is an upper perspective view of the lens driving device 900, and FIG. 21B is a lower perspective view of the lens driving device 900. Note that an outer case 904 illustrated in FIG. 20 is omitted from FIG. 21A. The outer case 904 and a suspension mechanism unit 903 illustrated in FIG. 20 are omitted from FIG. 21B.

The lens driving device 900 illustrated in FIG. 20 is configured including an autofocus actuator 902 (first holding member) for an autofocus function that focuses the camera, and a suspension mechanism 903 (second holding member) for image stabilization to maintain the shooting optical axis steady, by finely moving the autofocus actuator 902 in accordance with shaking of the camera. The autofocus actuator 902 serving as the first holding member and the suspension mechanism 903 serving as the second holding member are accommodated in the outer case 904 of the lens driving device 900.

First, the autofocus actuator 902 has a lens holder 921 that holds a lens member omitted from illustration, and a moving mechanism that moves the lens holder 921 along the direction of the optical axis. The moving mechanism is configured including a first coil 922, four magnets 923, an inner yoke 924 and outer yoke 925, and a leaf spring holding member 926 to which one side each of an upper leaf spring 927 and a lower leaf spring 928 are attached.

Once the lens driving device 900 is assembled, the other side of the upper leaf spring 927 is attached to the upper portion of the lens holder 921 (see FIG. 21A), while the other side of the lower leaf spring 928 is attached to the lower portion of the lens holder 921 (see FIG. 21B). The first coil 922 is disposed around the upper side of the lens holder 921, and the magnets 923 are disposed on the four sides at the lower side of the lens holder 921 (see FIG. 21B). Four magnets 923 are interposed between the inner yoke 924 and outer yoke 925, as illustrated in FIG. 21B.

Next, the suspension mechanism 903 is configured including a second coil holding member 931 that has printed coils 912 (second coils) disposed at four positions facing the magnets 923, four suspension wires 932 that pass through through holes 931$h$ provided at the four corners of the second coil holding member 931, a flexible printed circuit (FPC) board 933 that is electrically connected to the printed coils 912 and also electrically connected to the suspension wires 932, a lower case 934 having through holes 942 through which the suspension wires 932 pass, and magnetism detectors 935 that detect the position of the autofocus actuator 902 by detecting magnetism of the magnets 923, as illustrated in FIG. 20. One magnetism detector 935 is disposed beneath each of the magnets 923 arrayed in the X-axial direction and Y-axial direction as illustrated in FIG. 21B. The magnetism detectors 935 are soldered to the lower face of the FPC board 933, although details thereof are omitted from illustration.

The autofocus actuator 902 and suspension mechanism 903 are connected by the suspension wires 932. Specifically, the upper ends of the suspension wires 932 are soldered to the four corners or the upper leaf spring 927 as illustrated in FIG. 21A, and thus fixed to the autofocus actuator 902 side. On the other hand, the lower ends of the suspension wires 932 pass through the through holes 931 of the second coil holding member 931 (see FIG. 21A) and are soldered at through holes 933$h$ of the FPC board 933 (see FIG. 20), and thus fixed to the suspension mechanism unit 903 side. This configuration enables the autofocus actuator 902 to be rockably supported by the suspension mechanism 903. Accordingly, the autofocus actuator 902 can be moved in the X-axis direction and Y-axis direction that are orthogonal to the optical axis direction and that are orthogonal to each other.

However, it is conceivable that soldering of the suspension wires 932 and the upper leaf spring 927 in the lens driving device 900 configured this way will be performed manually (although this is not specifically stated). There has been a problem that such manual soldering deteriorates workability and the like. There also has been concern that manual soldering would place a load on the suspension wires 932 and the upper leaf spring 927, and in some cases might deform the suspension wires 932 and the upper leaf spring 927.

The present invention provides a lens driving device with good manufacturability, and a manufacturing method thereof.

SUMMARY

A lens driving device includes: a movable unit including a lens holding member capable of holding a lens member and a first driving mechanism configured to move the lens holding member in an optical axis direction; a suspension wire configured to support the movable unit movably in a direction intersecting the optical axis direction; a supporting member configured to support a lower end of the suspension wire; and a second driving mechanism configured to move the movable unit in a direction intersecting the optical axis direction. The movable unit further includes an upper leaf spring and a lower leaf spring configured to support the lens holding member movably in the optical axis direction and a fixing member disposed at an outer side of the lens holding member and configured to fix the upper leaf spring. The upper leaf spring includes a first portion fixed to the lens holding member, a second portion fixed to the fixing member, an elastic arm portion disposed between the first portion and the second portion, a wire fixing portion disposed at an outer side of the second portion and soldered to an upper end of the suspension wire, and a linking portion configured to connect between the second portion and the wire fixing portion. The linking portion has two extending portions extending from two separate positions on the second portion toward the wire fixing portion side. A plate-shaped protruding portion protruding inwards from the wire fixing portion is provided between the two extending portions.

According to the above configuration of the lens driving device according to the present invention, the wire fixing portion of the upper leaf spring and the upper end of the suspension wire can be soldered by irradiation of the protruding portion of the upper leaf spring by a laser beam and conducting heat from the protruding portion to the wire fixing portion. Accordingly, workability and the like improves as compared to a case of performing soldering manually, and defects in the soldering process can be reduced. Accordingly, a lens driving device with good manufacturability can be provided.

Also disclosed is a manufacturing method of a lens driving device according to an aspect of the present invention. The driving device includes a movable unit including a lens holding member capable of holding a lens member and a first driving mechanism configured to move the lens holding member in an optical axis direction, a suspension wire configured to support the movable unit movably in a direction intersecting the optical axis direction, a supporting member configured to support a lower end of the suspension wire, and a second driving mechanism configured to move the movable unit in a direction intersecting the optical axis direction. The movable unit further includes an upper leaf spring and a lower leaf spring configured to support the lens holding member movably in the optical axis direction and a fixing member disposed at an outer side of the lens holding member and configured to fix the upper leaf spring. The upper leaf spring includes a first portion to be fixed to the lens holding member, a second portion to be fixed to the fixing member, an elastic arm portion disposed between the first portion and the second portion, a wire fixing portion disposed at an outer side of the second portion and to be soldered to an upper end of the suspension wire, and a linking portion configured to connect between the second portion and the wire fixing portion. The linking portion has two extending portions extending from two separate positions on the second portion toward the wire fixing portion side, and a plate-shaped protruding portion protruding inwards from the wire fixing portion is provided between the two extending portions. The method includes: an application process of applying solder paste on the wire fixing portion; and a laser irradiation process of soldering the wire fixing portion and the suspension wire by irradiation of the protruding portion connected to the wire fixing portion by a laser beam.

According to this configuration, the protruding portion of the upper leaf spring is heated by the laser beam, and the wire fixing portion connected to the protruding portion is heated. Accordingly, the solder paste applied to the wire fixing portion is heated and becomes molten solder. Thereafter, the solder cools, and the upper end of the suspension wire and the wire fixing portion of the upper leaf spring are soldered. Accordingly, workability and the like improves as compared to a case of performing soldering manually, and defects in the soldering process can be reduced.

BRIEF DESCRIPTION OF THE DRAWINGS

FIGS. 11A and 11B are diagrams for describing a first driving mechanism of the lens driving device according to the first embodiment of the present invention, FIG. 11A being a bottom view where the lens holding member and biasing member illustrated in FIG. 4B have been omitted from illustration, and FIG. 11B is a bottom view illustrating only permanent magnets and a fixing member illustrated in FIG. 11A;

FIG. 20 is a disassembled perspective view of a lens driving device according to a conventional example.

DESCRIPTION OF THE EXEMPLARY EMBODIMENTS

Embodiments of the present invention will be described with reference to the drawings.

First Embodiment

Figure 1:
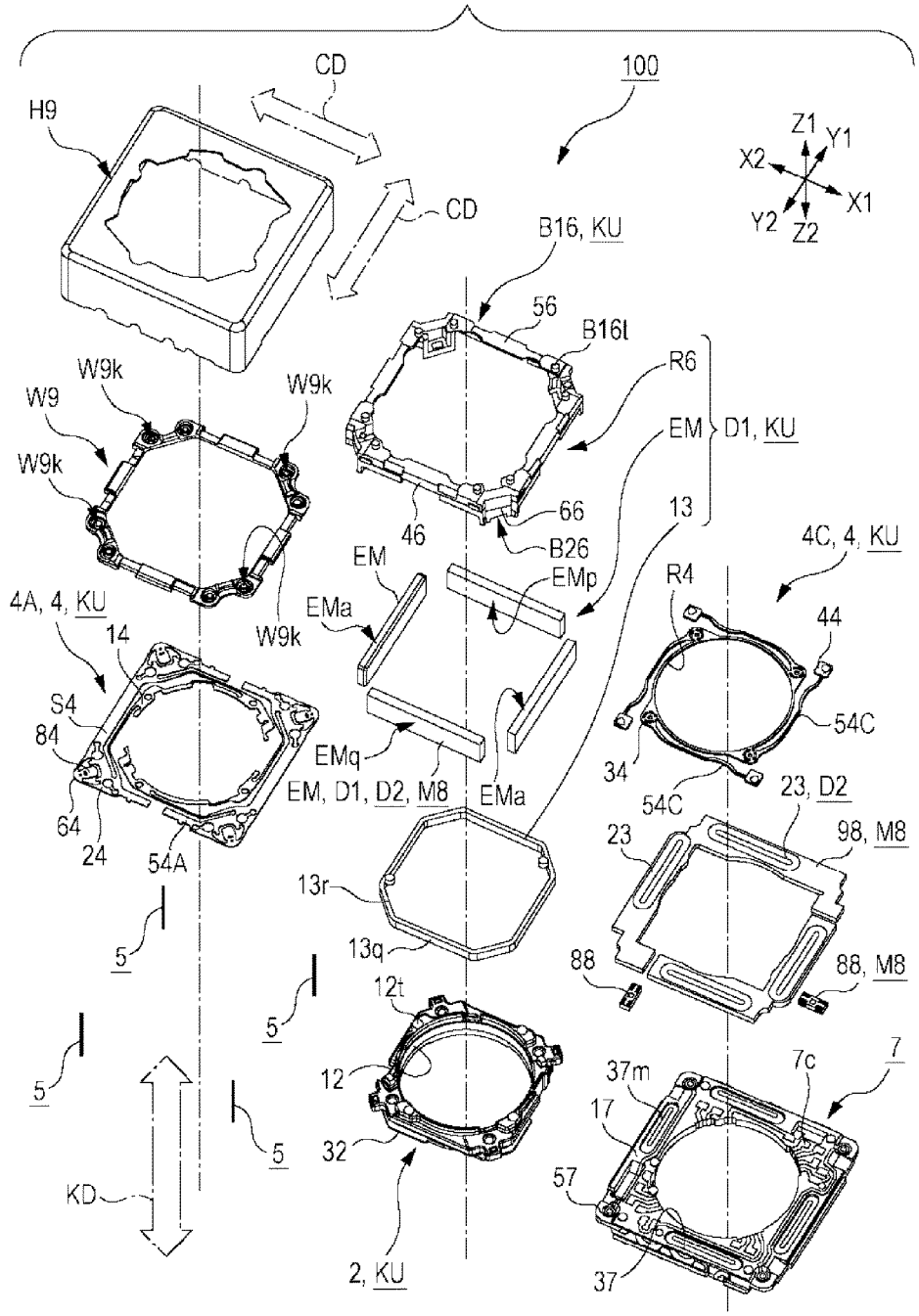
FIG. 1 is a disassembled perspective view for describing a lens driving device according to a first embodiment of the present invention.
Figure 2:
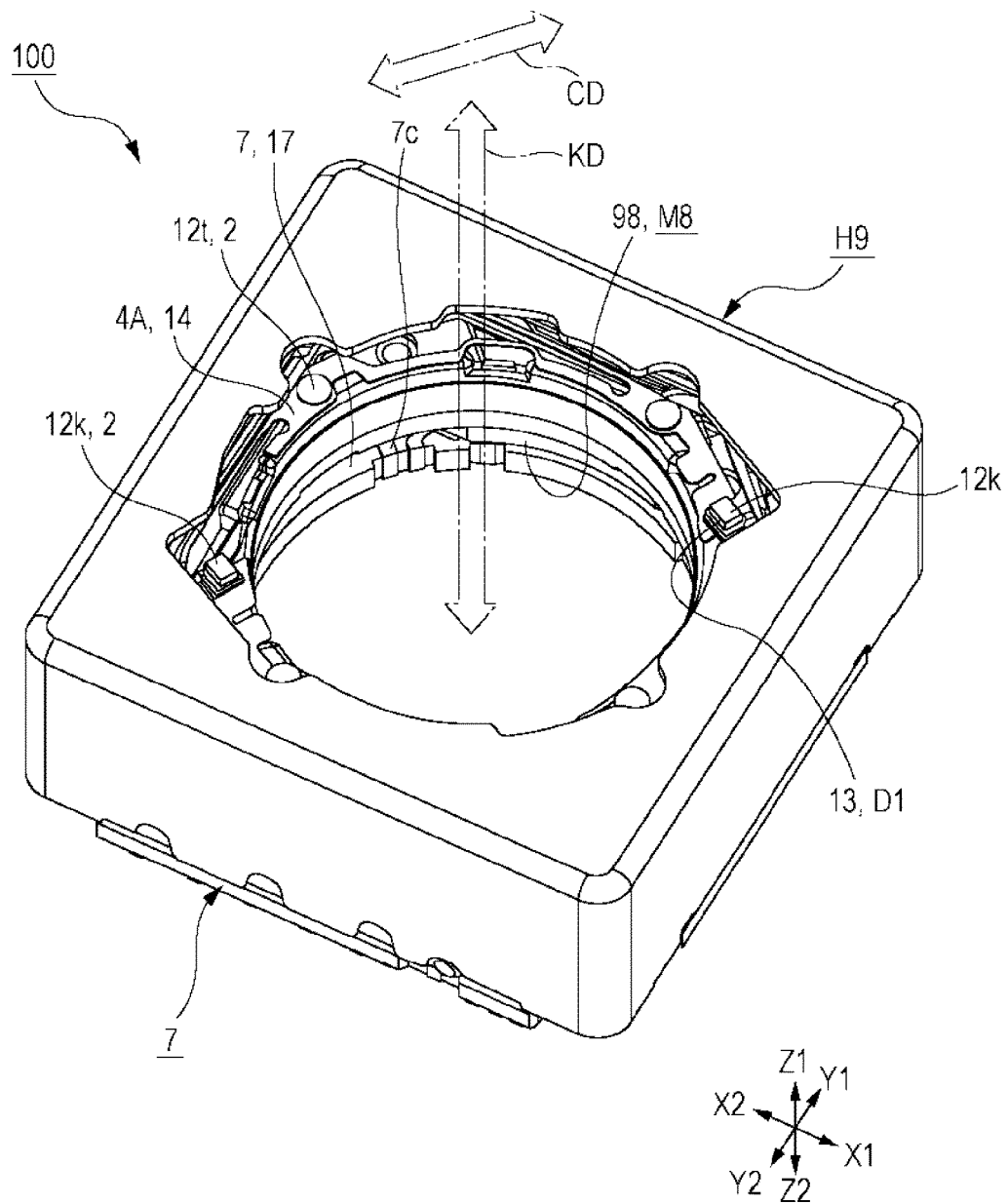
FIG. 2 is an upper perspective view for describing the lens driving device according to the first embodiment of the present invention.
Figure 3A:
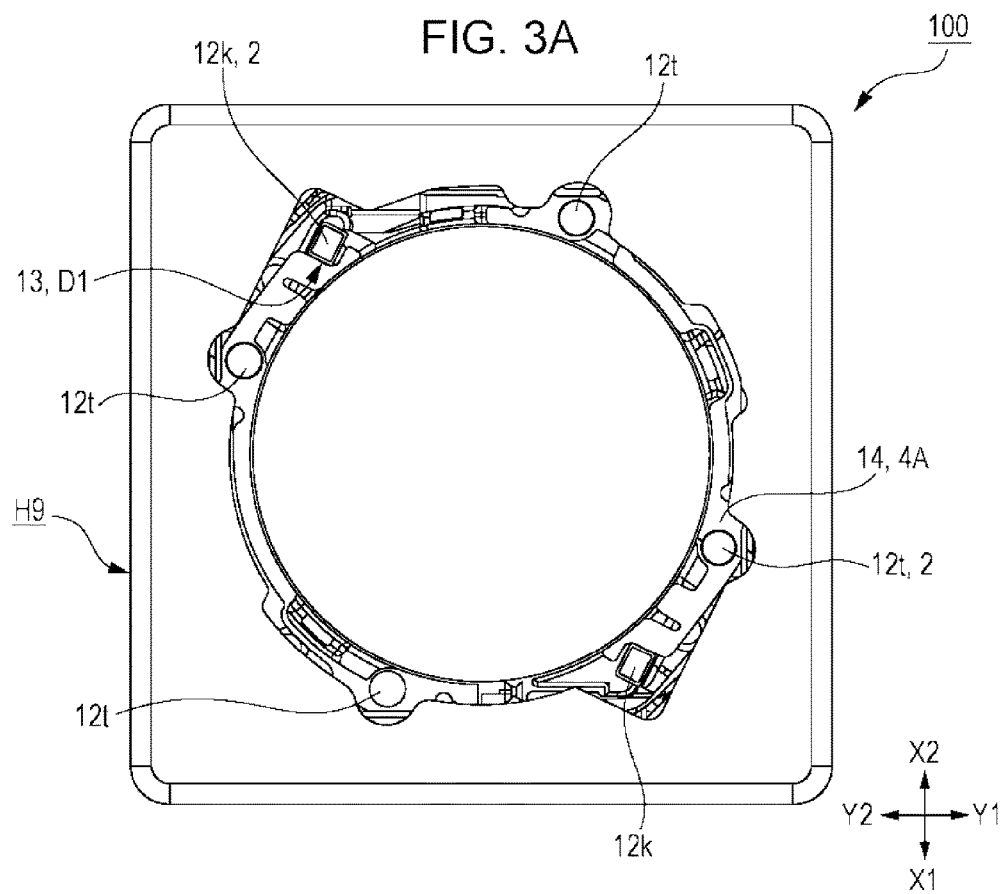
FIGS. 3A and 3B are diagrams for describing the lens driving device according to the first embodiment of the present invention, FIG. 3A being a top view of the configuration in FIG. 2 from the Z1 side, and FIG. 3B being a frontal view of the configuration in FIG. 2 from the Y2 side.
Figure 3B:
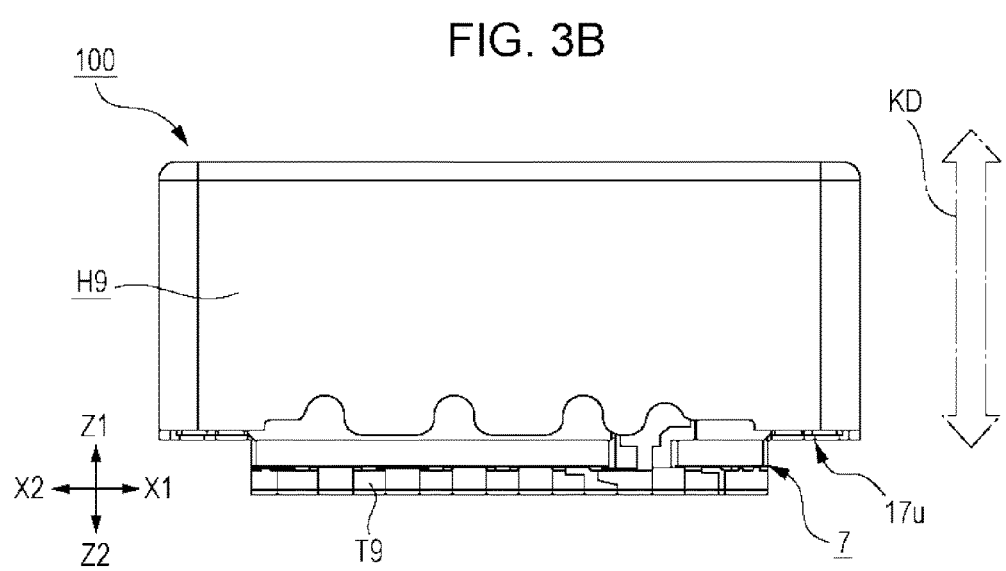
Figure 4A:
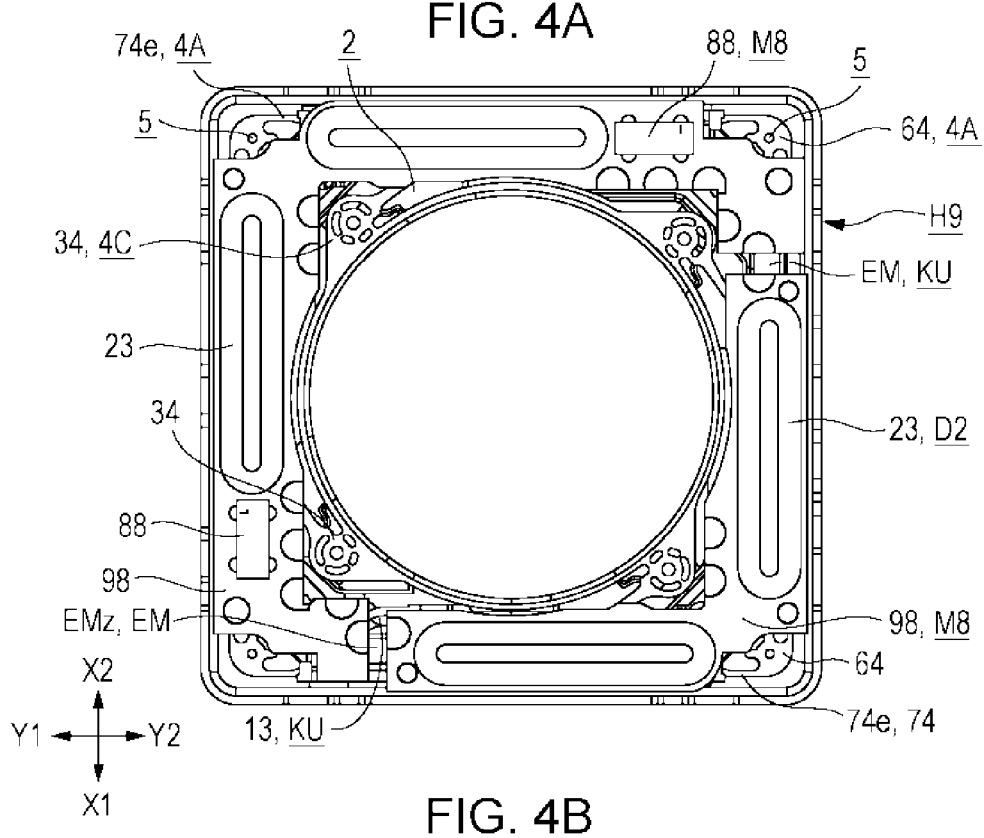
FIGS. 4A and 4B are diagrams for describing the lens driving device according to the first embodiment of the present invention, FIG. 4A being a bottom view of the configuration in FIG. 2 from the Z2 side with a base member omitted from illustration, and FIG. 4B being a bottom view from which a multi-layer board, illustrated in FIG. 4A, has been omitted from illustration.
Figure 4B:
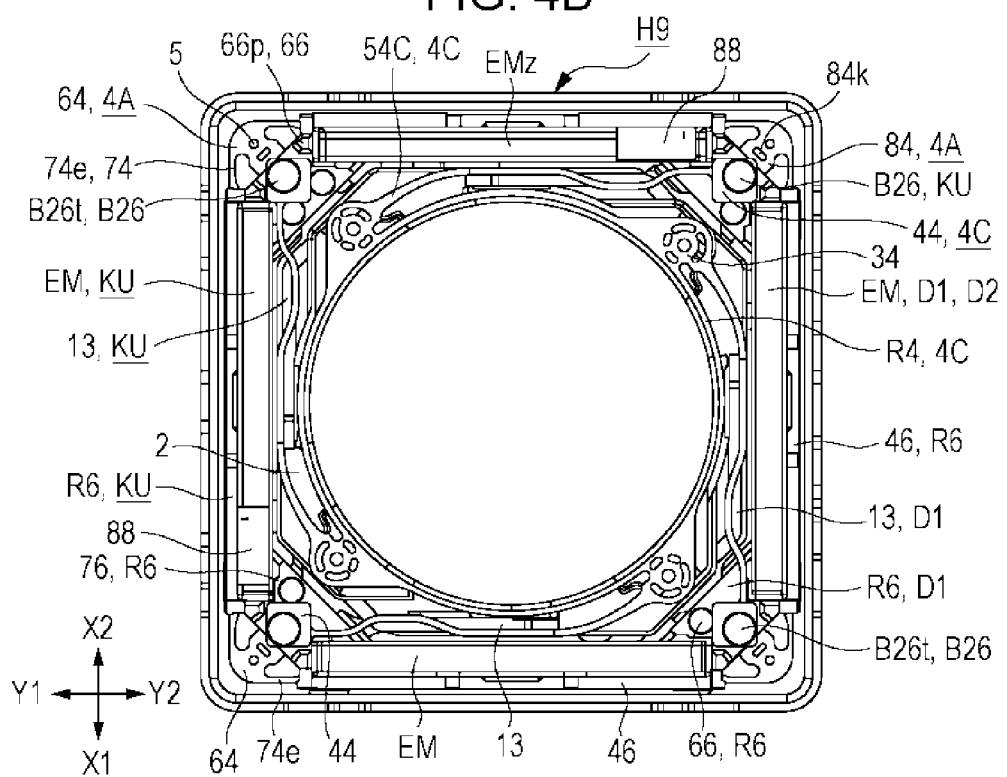
Figure 5A:
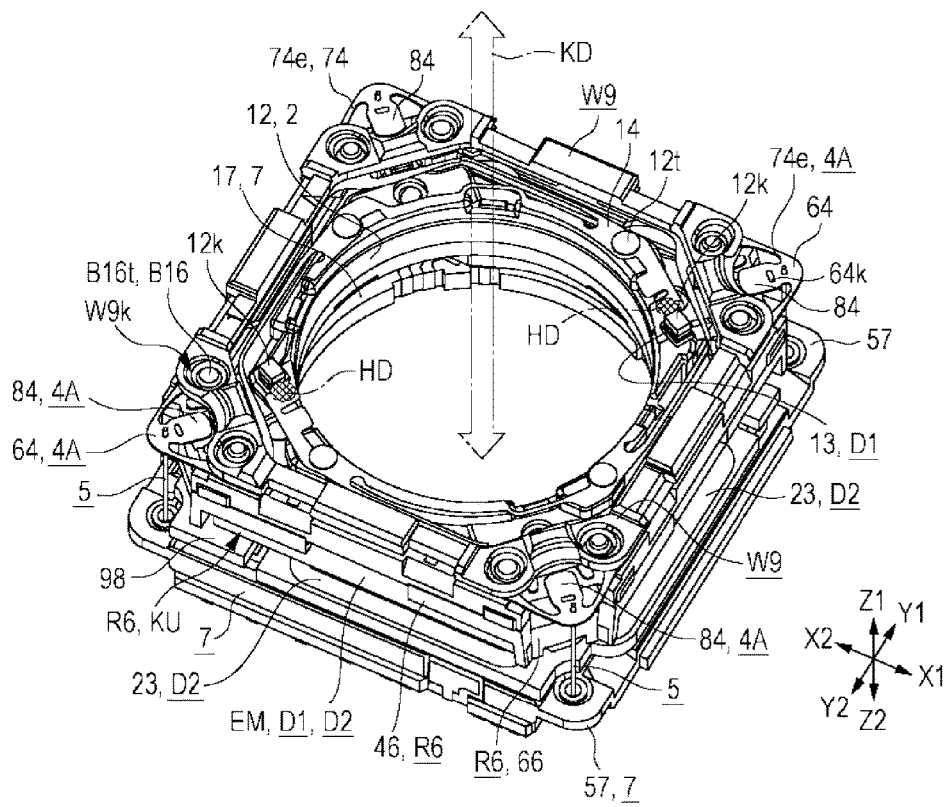
FIGS. 5A and 5B are diagrams for describing the lens driving device according to the first embodiment of the present invention, FIG. 5A being an upper perspective view with a case member, illustrated in FIG. 2, omitted from illustration, and FIG. 5B being a frontal view of the configuration in FIG. 5A from the Y2 side.

FIG. 1 is a disassembled perspective view for describing a lens driving device 100 according to a first embodiment of the present invention. FIG. 2 is an upper perspective view for describing the lens driving device 100. FIGS. 3A and 3B are diagrams for describing the lens driving device 100, FIG. 3A being a top view of the configuration in FIG. 2 from the Z1 side and FIG. 3B being a frontal view of the configuration in FIG. 2 from the Y2 side. FIG. 4A is a bottom view of the lens driving device 100 from the Z2 side with a base member 7 omitted from illustration, and FIG. 4B is a bottom view from which a multi-layer board 98, illustrated in FIG. 4A, has been omitted from illustration. FIG. 5A is an upper perspective view with a case member H9 of the lens driving device 100, illustrated in FIG. 2, omitted from illustration, and FIG. 5B is a frontal view of the configuration in FIG. 5A from the Y2 side.

The lens driving device 100 according to the first embodiment of the present invention has a cuboid shape such as illustrated in FIGS. 2 through 3B. The lens driving device 100 includes a movable unit KU including a first driving mechanism D1 that moves a lens holding member 2 capable of holding a lens member (omitted from illustration) along an optical axis direction KD of the lens member, suspension wires 5 that support the movable unit KU so as to be capable of moving in a direction (intersecting direction CD) intersecting the optical axis direction KD (the Z direction in FIG. 1), a base member 7 disposed beneath the movable unit KU, a second driving mechanism D2 that moves the movable unit KU in the direction (intersecting direction CD) intersecting the optical axis direction KD, and a detecting unit M8 that detects the position of the movable unit KU in the intersecting direction CD (direction intersecting the optical axis direction KD), as illustrated in FIG. 1.

Figure 5B:
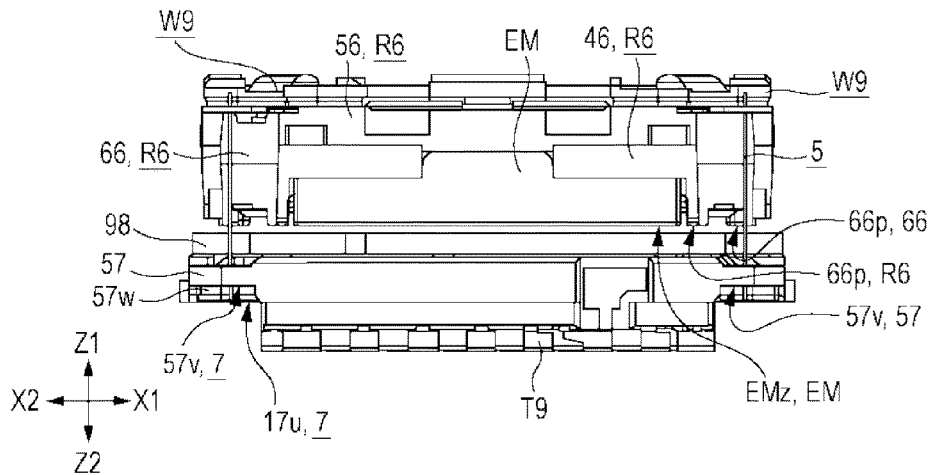

As illustrated in FIGS. 1 through 4B, the lens driving device 100 according to the first embodiment of the present invention also includes a case member H9 that accommodates the movable unit KU, suspension wires 5, and so forth as illustrated in FIG. 1, and a frame member W9 disposed above the lens holding member 2 (in the Z1 direction in FIG. 5A), as illustrated in FIGS. 5A and 5B. Note that the intersecting direction CD (direction intersecting the optical axis direction KD) illustrated in FIGS. 1 and 2 is an exemplary illustration thereof, to facilitate description.

The first driving mechanism D1 is configured including a ring-shaped first coil 13 wound and fixed on the perimeter of the lens holding member 2, four permanent magnets EM (driving magnets) disposed facing the outer side of the first coil 13 across a space interposed therebetween, and a fixing member R6 to which the four permanent magnets EM are fixed, as illustrated in FIGS. 1 and 4B through 5B. The first driving mechanism D1 moves the lens holding member 2 along the optical axis direction KD, using magnetic force generated by current being applied from a power source to the first coil 13, and magnetic fields generated from the permanent magnets EM.

The second driving mechanism D2 is configured having the above-described four permanent magnets EM (driving magnets) and second coils 23 disposed below the permanent magnets EM (in the Z2 direction in FIG. 5A), as illustrated in FIGS. 1, 5A, and 5B. The second driving mechanism D2 moves the movable unit KU in the intersecting direction CD (direction intersecting the optical axis direction KD) using magnetic force generated by current being applied from a power source to the second coils 23, and magnetic fields generated from the permanent magnets EM. Note that the driving magnets in the first driving mechanism D1 and the driving magnets in the second driving mechanism D2 preferably are the four permanent magnets EM shared therebetween, in the first embodiment of the present invention. In doing so, the first coil 13 of the first driving mechanism D1 is disposed on the inner side of the permanent magnets EM, and the second coils 23 of the second driving mechanism D2 are disposed below the permanent magnets EM, so that there is no interference between the coils.

The detecting unit M8 is configured including the above-described permanent magnets EM, magnetism detecting members 88 that detect magnetic fields generated by the permanent magnets EM (detecting magnets), and a multi-layer board 98 on which the magnetism detecting members 88 are mounted. The detecting unit M8 detects change in the magnetic fields of the permanent magnets EM that are disposed to the side of the movable unit KU and move along with the rocking of the movable unit KU, and detects the position of the movable unit KU in the direction intersecting the optical axis direction KD (intersecting direction CD). Two of the permanent magnets EM are preferably used in common as these detecting magnets in the first embodiment of the present invention.

As described above, the lens driving device 100 has a lens member that is omitted from illustration held by the lens holding member 2 by adhesive agent or the like, and is attached to a mounting board (omitted from illustration) to which an imaging device is mounted. The lens driving device 100 moves the lens held by the lens member along the optical axis direction KD (the Z direction in FIG. 2) to adjust the focal distance as to the imaging device, and can correct rocking of the optical axis direction KD. Accordingly, the lens driving device 100 that has the two functions of autofocus functions and image stabilization functions can be provided.

Figure 6A:
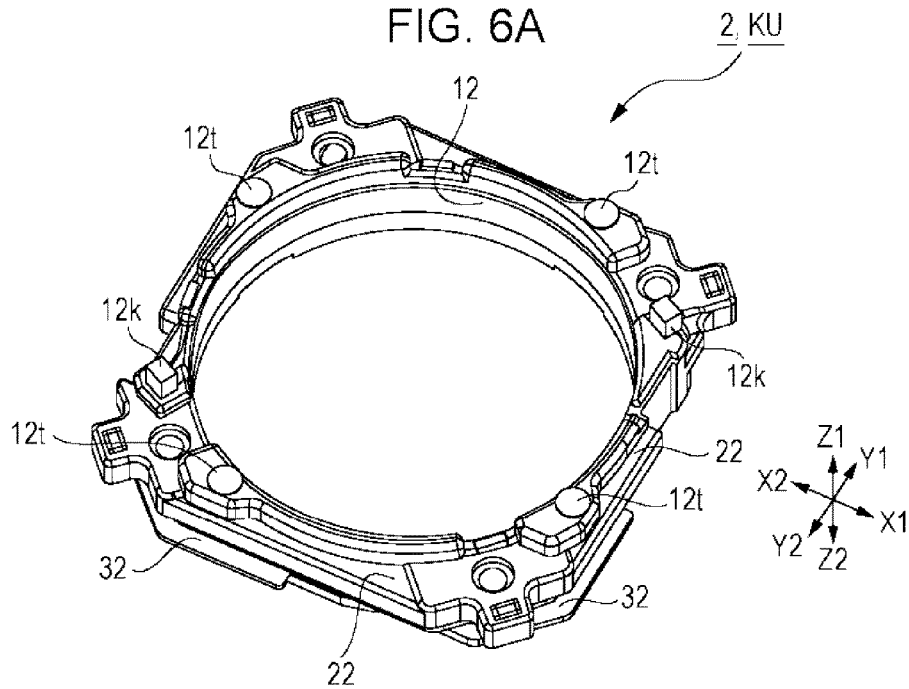
FIGS. 6A and 6B are diagrams for describing a lens holding member of the lens driving device according to the first embodiment of the present invention, FIG. 6A being an upper perspective view of the lens holding member, and FIG. 6B being an upper perspective view where a biasing member and first coil are mounted to the lens holding member.
Figure 6B:
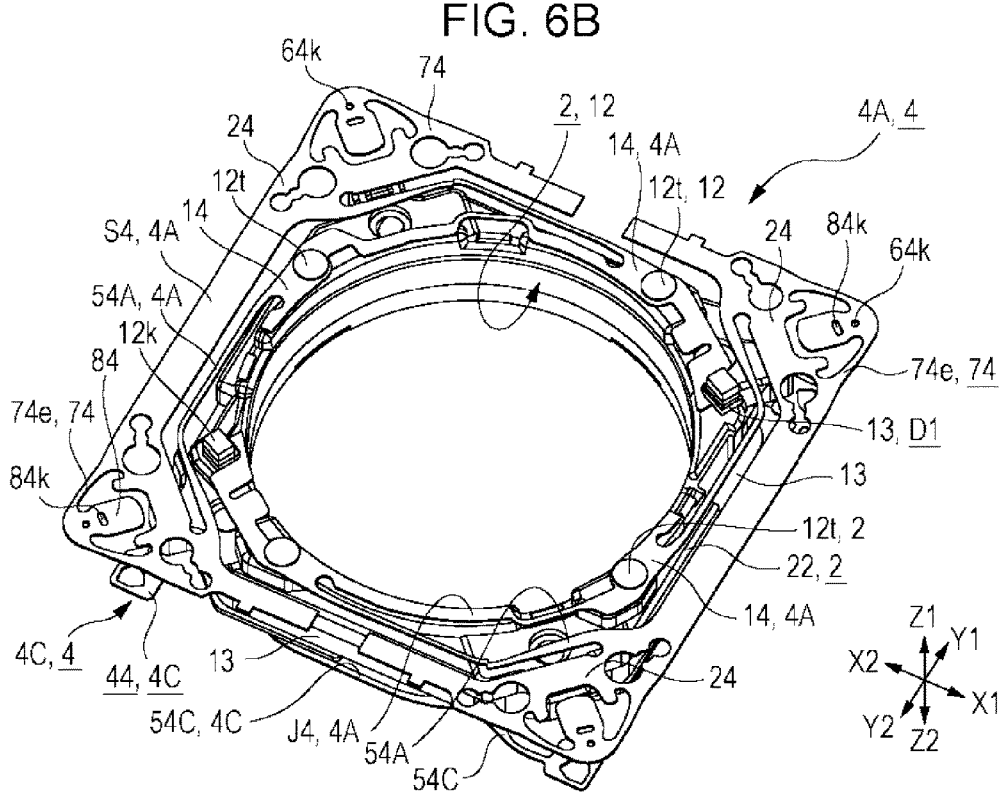
Figure 7A:
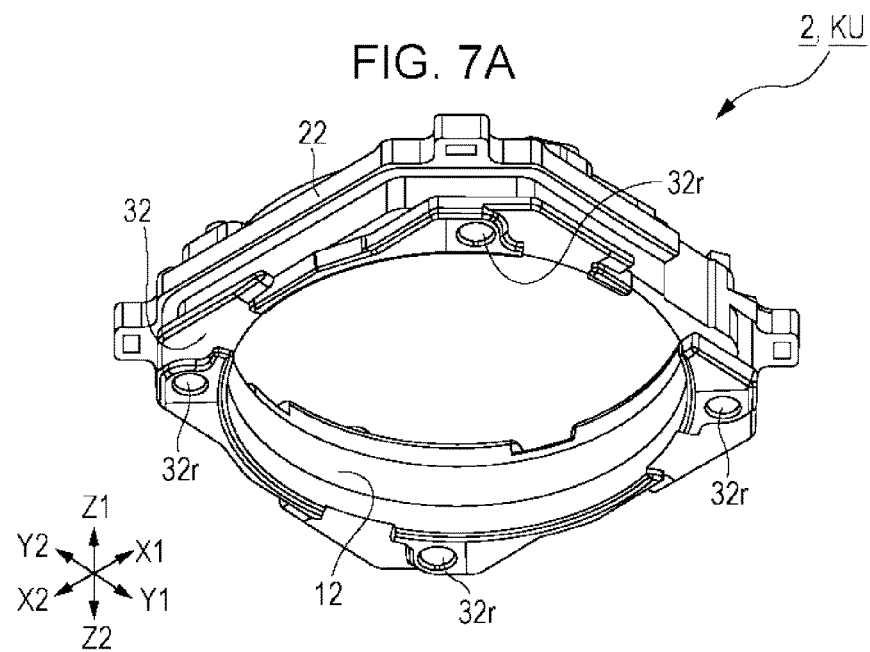
FIGS. 7A and 7B are diagrams for describing the lens holding member of the lens driving device according to the first embodiment of the present invention, FIG. 7A being a lower perspective view of the lens holding member, and FIG. 7B being a lower perspective view where the biasing member and first coil are mounted to the lens holding member.

Next, the components will be described in detail. First, the movable unit KU of the lens driving device 100 will be described. FIGS. 6A and 6B are diagrams for describing the lens holding member 2 of the movable unit KU. FIG. 6A is an upper perspective view of the lens holding member 2, and FIG. 6B is an upper perspective view where a biasing member 4 and the first coil 13 of the first driving mechanism D1 have been mounted to the lens holding member 2. FIG. 7A is a lower perspective view of the lens holding member 2, and FIG. 7B is a lower perspective view where the biasing member 4 and the first coil 13 of the first driving mechanism D1 have been mounted to the lens holding member 2.

The movable unit KU of the lens driving device 100 is configured including the lens holding member 2 capable of holding the lens member, the biasing member 4 that supports the lens holding member 2 so as to be movable in the optical axis direction KD of the lens member, upper spring fixing members B16 and lower spring fixing members B26 by which a part of the biasing member 4 is fixed, and the first driving mechanism D1 that moves the lens holding member 2 in the optical axis direction KD, as illustrated in FIG. 1. Note that the upper spring fixing members B16 and the lower spring fixing members B26 are disposed on the outer side of the lens holding member 2. A fixing member R6 where the upper spring fixing members B16 and lower spring fixing members B26 are formed is also disposed on the outer side of the lens holding member 2.

Figure 7B:
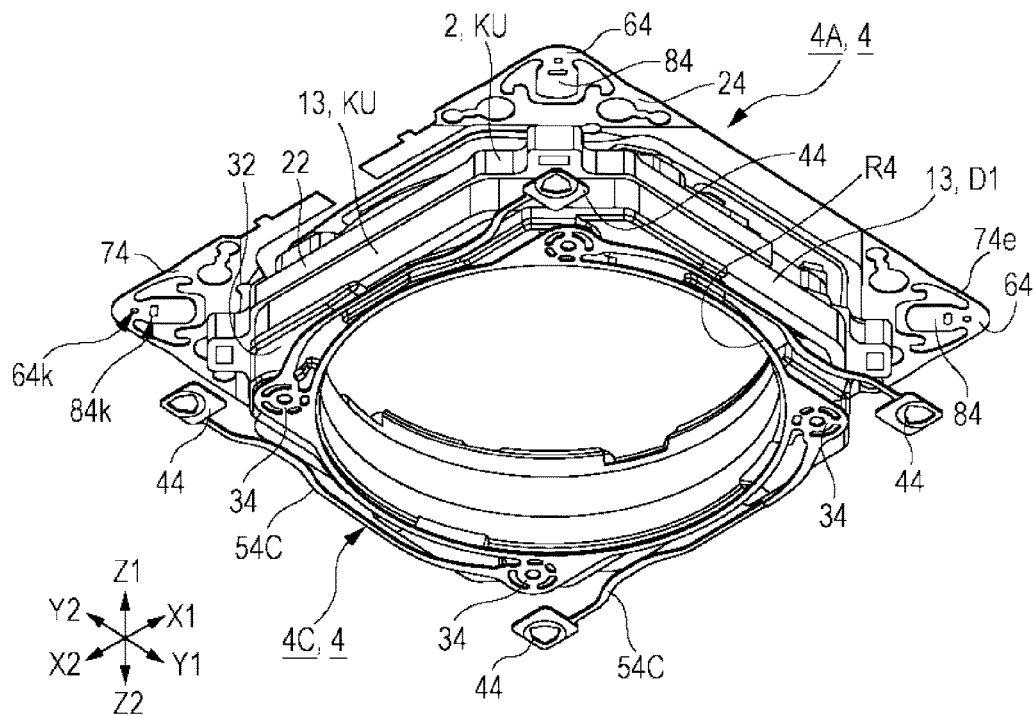

The biasing member 4 in the first embodiment of the present invention is configured including an upper leaf spring 4A of which a part of one side is fixed to the upper part of the lens holding member 2 as illustrated in FIG. 6B, and a lower leaf spring 4C of which a part of one side is fixed to the lower part of the lens holding member 2 as illustrated in FIG. 7B, thereby supporting the lens holding member 2. Part of the other side of the upper leaf spring 4A is fixed to the upper spring fixing members B16, and part of the other side of the lower leaf spring 4C is fixed to the lower spring fixing members B26. The upper spring fixing members B16 and lower spring fixing members B26 are preferably provided integrally with the later-described fixing member R6 in the first embodiment of the present invention. Note that the upper leaf spring 4A is divided into two.

The lens holding member 2 of the movable unit KU is formed having a cylindrical shape as illustrated in FIGS. 6A through 7B, using a liquid crystal polymer (LCP), which is a type of synthetic resin material. The lens holding member 2 is configured primarily including a barrel portion 12 that has a circular inner peripheral face and a rectangular outer peripheral face, an eaves portion 22 protruding outwards in the radial direction from the outer peripheral face at the upper end of the barrel portion 12 (at the Z1 side in FIGS. 6A and 6B), and a flange portion 32 protruding outwards in the radial direction from the outer peripheral face at the lower end of the barrel portion 12 (at the Z2 side in FIGS. 6A and 6B). The lens holding member 2 is disposed below (Z2 direction in FIG. 5A) frame member W9 and above (Z1 direction in FIG. 5A) the base member 7, as illustrated in FIG. 5A.

A lens member, omitted from illustration, can be mounted in the barrel portion 12 of the lens holding member 2, the lens member being held by the lens holding member 2 using an adhesive agent or the like. Four column-shaped protrusions 12t that protrude upward are provided on the upper end side of the barrel portion 12 as illustrated in FIGS. 6A and 6B, at positions equidistant as to the optical axis. When the lens driving device 100 is assembled, the four protrusions 12t (lens holding member 2) and the upper leaf spring 4A of the biasing member 4 (later-described first portion 14) are engaged. Each upper leaf spring 4A is then fixed at one side to the lens holding member 2 by fusing of the protrusions 12t.

Further, two prism-shaped winding posts 12k that protrude upwards are provided on the upper end side of the barrel portion 12 as illustrated in FIGS. 6A and 6B. Each of the coil ends of the first coil 13 are wound onto the winding posts 12k as illustrated in FIG. 5A, and are soldered to each of the upper leaf springs 4A. FIG. 5A schematically indicates solder HD where the two coil ends and the upper leaf springs 4A have been soldered together, by cross-hatching indicated by single-dot lines.

The first coil 13 is wound in an octagonal shape on the outer peripheral face of the barrel portion 12 between the eaves portion 22 and the flange portion 32 (see FIG. 1), following the outer peripheral face in an octagonal shape, as illustrated in FIG. 7B.

Four recesses 32r, that are recessed portions, are provided on the bottom face of the flange portion 32 side, as illustrated in FIG. 7A, at positions equidistant as to the optical axis. When the lens driving device 100 is assembled, the four recesses 32r (lens holding member 2) are disposed facing the lower leaf spring 4C (later-described third portion 34) of the biasing member 4 as illustrated in FIG. 7B, with these portions being fixed by adhesive agent, thereby fixing one side portion of the lower leaf spring 4C to the lens holding member 2.

Figure 8A:
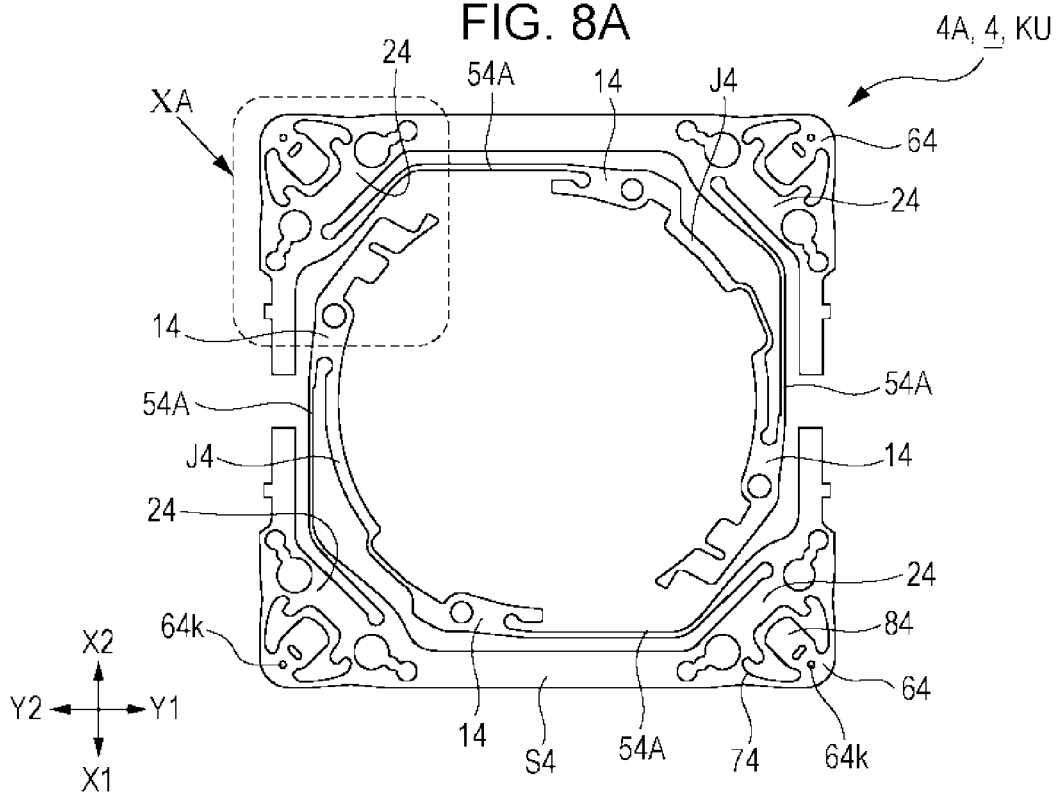
FIGS. 8A and 8B are diagrams for describing the biasing member of the lens driving device according to the first embodiment of the present invention, FIG. 8A being a top view of an upper leaf spring of the biasing member, and FIG. 8B being a bottom view of a lower leaf spring of the biasing member.
Figure 8B:
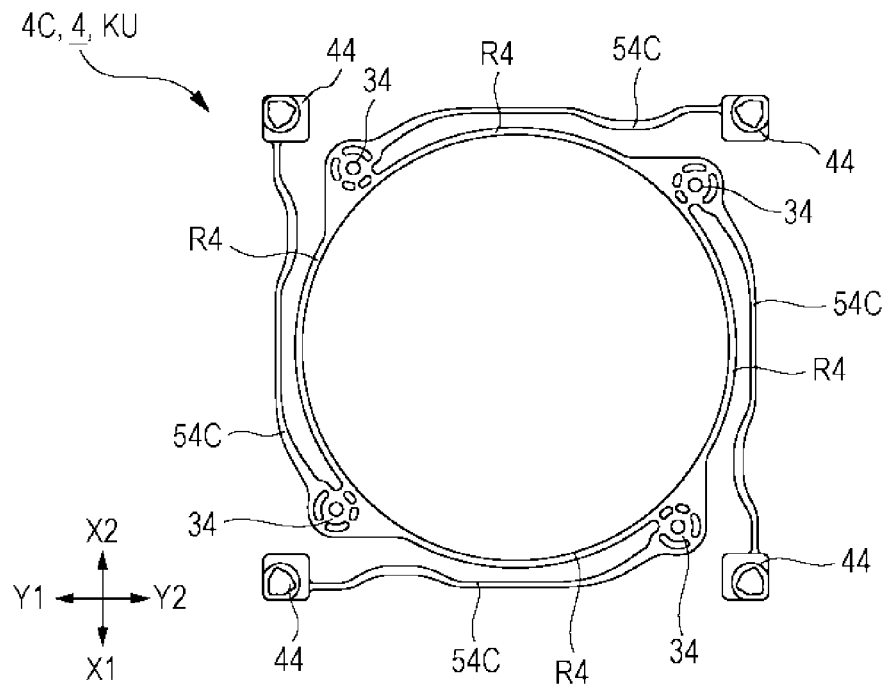
Figure 9A:
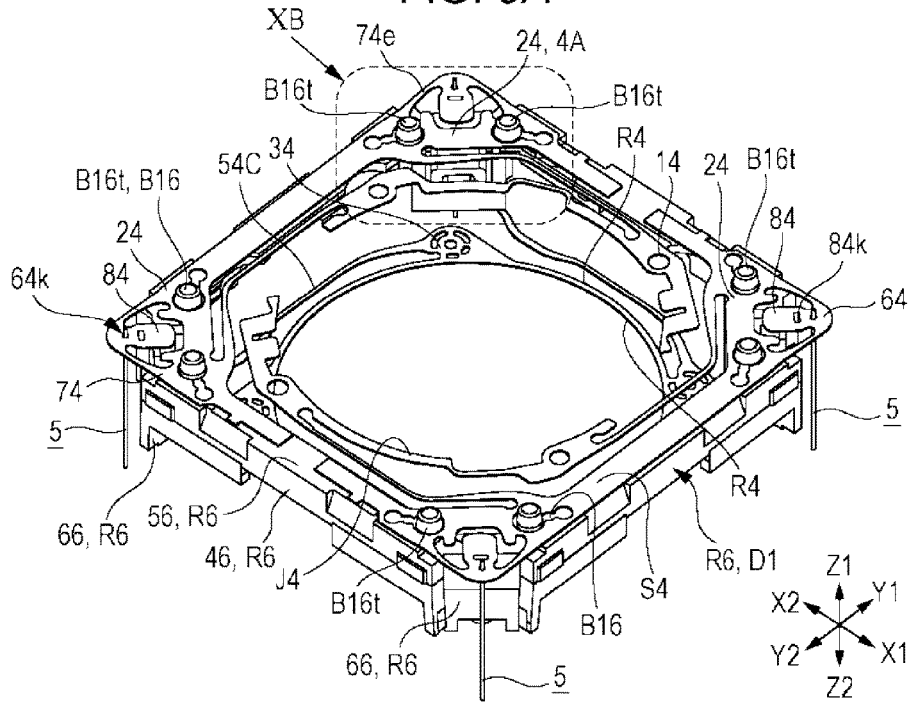
FIGS. 9A and 9B are diagrams for describing the biasing member of the lens driving device according to the first embodiment of the present invention, FIG. 9A being an upper perspective view where suspension wires and fixing members are mounted to the biasing member, and FIG. 9B being a lower perspective view, viewing the configuration in FIG. 9A from below.
Figure 9B:
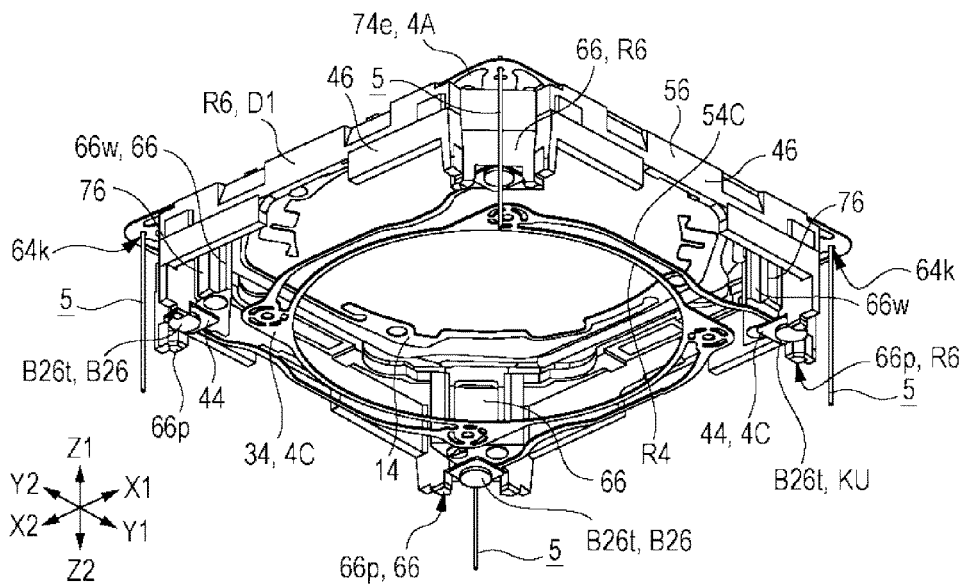
Figure 10A:
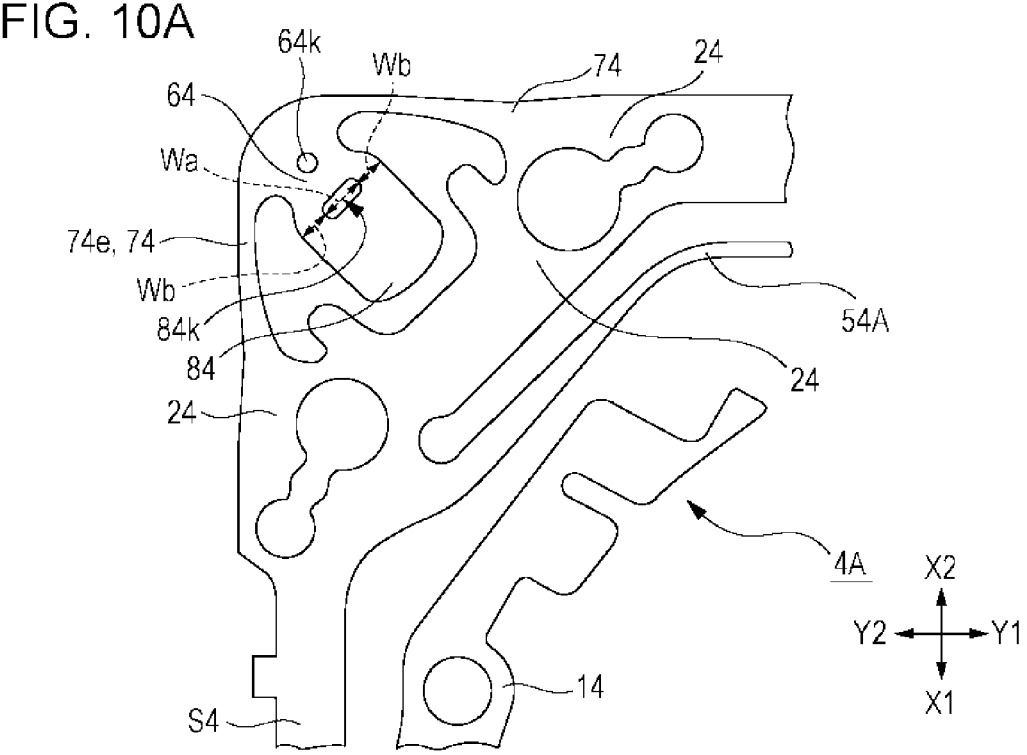
FIGS. 10A and 10B are diagrams for describing the biasing member of the lens driving device according to the first embodiment of the present invention, FIG. 10A being an enlarged top view of a portion XA in FIG. 8A, and FIG. 10B being an enlarged upper perspective view of a portion XB in FIG. 9A.

Next, the biasing member 4 of the movable unit KU will be described. FIGS. 8A and 8B are diagrams for describing the biasing member 4 of the movable unit KU. FIG. 8A is a top view of upper leaf spring 4A of the biasing member 4 from the Z1 side, and FIG. 8B is a bottom view of the lower leaf spring 4C of the biasing member 4 from the Z2 side. FIG. 9A is an upper perspective view where suspension wires 5 and fixing members R6 are mounted to the biasing member 4, and FIG. 9B is a lower perspective view, viewing the configuration in FIG. 9A from below. FIG. 10A is an enlarged top view of a portion XA in FIG. 8A, and FIG. 10B being an enlarged upper perspective view of a portion XB in FIG. 9A. Note that in FIG. 10B, solder HD where the upper end of a suspension wire 5 and upper leaf spring 4A (wire fixing portion 64) have been soldered together is schematically illustrated by cross-hatching indicated by a single-dot line, to facilitate description.

The biasing member 4 of the movable unit KU is manufactured from a metal plate of which copper alloy is a primary material. The biasing member 4 is configured including the upper leaf spring 4A that is disposed between the lens holding member 2 and frame member W9 and has a larger-diameter opening than the inner circumferential face of the barrel portion 12 of the lens holding member 2 as illustrated in FIG. 5A, and the lower leaf spring 4C that is disposed between the lens holding member 2 and the base member 7 as illustrated in FIG. 5B. The lens holding member 2, and each of the upper leaf spring 4A and lower leaf spring 4C of the biasing member 4, are then engaged, and the lens holding member 2 is supported such that the lens holding member 2 can move in the optical axis direction KD (Z direction in FIG. 2).

First, the upper leaf spring 4A of the biasing member 4 is made up of two separate members as illustrated in FIG. 8A, manufactured almost rotationally symmetrically, and are disposed so that the outer shape forms a generally rectangular shape. The upper leaf spring 4A is electrically connected to the first coil 13 by solder HD as illustrated in FIG. 5A, and according functions as a power supply member to the first coil 13. The upper leaf spring 4A is disposed so that the thickness direction thereof is aligned with the optical axis direction KD.

Figure 10B:
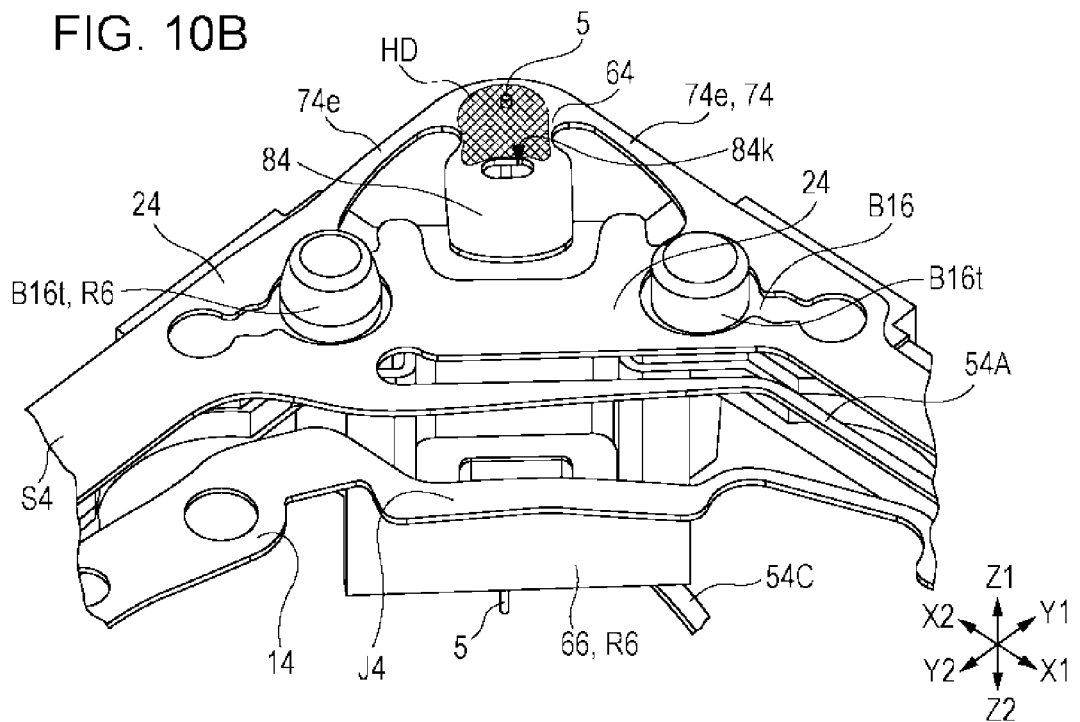

The upper leaf spring 4A has multiple (four in the first embodiment of according to the present invention) first portions 14 that are fixed to the lens holding member 2 as illustrated in FIGS. 6B and 8A, multiple (four in the first embodiment of according to the present invention) second portions 24 that are situated further toward the outer peripheral side than the first portions 14 and are fixed to the upper spring fixing members B16 as illustrated in FIGS. 8A and 9A, four elastic arm portions 54A provided between the first portions 14 and second portions 24 as illustrated in FIG. 8A, connecting portions J4 that extend from the first portions 14 and connect the first portions 14 to each other, two bridging portions S4 that connect the second portions 24 with each other, four wire fixing portions 64 that are situated on the outer sides of the second portions 24 and are soldered to the upper ends of the suspension wires 5 as illustrated in FIGS. 10A and 10B, linking portions 74 to connect between the second portions 24 and the wire fixing portions 64, and plate-shaped protruding portions 84 protruding from the wire fixing portions 64 toward the inner side (toward the optical axis side).

First, with regard to the four first portions 14 of the upper leaf spring 4A, when the upper leaf spring 4A is assembled into the lens driving device 100, the protrusions 12t of the lens holding member 2 are inserted into through holes provided to the first portions 14 as illustrated in FIG. 6B, and each of these four portions are swaged, whereby one side of the upper leaf spring 4A is fixed to the lens holding member 2.

In the same way, with regard to the second portions 24 of the upper leaf spring 4A, protrusions B16t (described later) of the upper spring fixing members B16 are inserted into the two through holes provided to each of four locations on the second portions 24 (for a total of eight; see FIG. 8A), and these portions are fixed by adhesive agent, whereby the other side of the upper leaf spring 4A is fixed to the fixing member R6 side.

Thus, the upper leaf spring 4A has two members configured in almost point symmetry as illustrated in FIG. 8A, being fixed to the lens holding member 2 by four equidistant positions of the first portions 14, and also being fixed to the fixing member R6 by four equidistant positions of the second portions 24. Accordingly, the lens holding member 2 can be supported in a well-balanced manner.

The four wire fixing portions 64 of the upper leaf spring 4A are provided on the outer sides of the second portions 24 fixed to the upper spring fixing members B16, as illustrated in FIG. 8A. The four wire fixing portions 64 each may have a penetrated portion 64k formed as a through hole. The suspension wires 5 may be inserted through these through hole portions 64k, as illustrated in FIGS. 9A and 9B, and the upper ends of the suspension wires 5 are soldered thereto, as illustrated in FIG. 10B.

Each linking portion 74 of the upper leaf spring 4A is configured having two extending portions 74e extending from two separated locations on the second portion 24 toward the wire fixing portion 64 side. These two extending portions 74e have spring properties, and enable the movable unit KU to move in a direction (intersecting direction CD) intersecting the optical axis direction KD.

Each protruding portion 84 of the upper leaf spring 4A is formed having a rectangular shape, as illustrated in FIGS. 8A and 10A, and protrude from the wire fixing portion 64 between the two extending portions 74e toward the inner side (toward the middle portion side of the second portion 24). The direction in which the protruding portion 84 protrudes is toward the optical axis at the center. In other words, it can be said that the protruding portion 84 protrudes in a direction following a line connecting the penetrated portion 64k of the wire fixing portion 64 and the center of the optical axis. The protruding portions 84 are capable of being irradiated by a laser beam.

Accordingly, the wire fixing portions 64 of the upper leaf spring 4A and the upper ends of the suspension wires 5 may be soldered, by irradiating the protruding portions 84 of the upper leaf spring 4A by laser beams, and transmitting heat from the protruding portions 84 to the wire fixing portions 64. Accordingly, workability can be improved and defects in the soldering process can be reduced as compared to a case of manually soldering.

Further, the protruding portions 84 are configured protruding from the wire fixing portions 64 toward the inner side (optical axis side), thereby suppressing increase in the outer shape of the upper leaf spring 4A, and consequently enabling the outer size of the lens driving device 100 to be reduced.

Further, a slender opening 84k may be formed on each protruding portion 84, adjacent to the wire fixing portion 64 side, as illustrated in FIGS. 8A and 10A. That is to say, the opening 84k is provided on the inward side from the wire fixing portion 64. The opening 84k may be formed of a through hole (a penetrating slot), the dimension thereof in the orthogonal direction (Wa in FIG. 10A) orthogonal to the protrusion direction of the protruding portion 84 being formed greater than the dimension thereof in the protrusion direction. Note that the portion of the protruding portion 84 situated on the inward side from the opening 84k may be a laser irradiation portion where the above-described laser irradiation is performed.

At the time of applying solder paste to the wire fixing portion 64 and soldering by irradiating the protruding portion 84 by laser beam, the molten solder HD is dammed up by the opening 84k (see FIG. 10B), and can be kept from widely spreading to the protruding portion 84 side. Accordingly, variance in the amount of solder at the wire fixing portions 64 can be reduced, and soldering the wire fixing portions 64 and the upper end of the suspension wires 5 can be carried out in a sure manner. Further, no solder HD flows to the portion irradiated by laser beam (laser irradiation portion), so scattering of solder HD due to the laser beam and scorching of nearby synthetic resin material due to irregular reflection of the laser beam can be prevented. Note that part of the solder HD is situated adjacent to an outer edge portion of the opening 84k.

Further, the opening 84k according to the first embodiment of the present invention may be set such that the width dimension of the opening 84k in the orthogonal direction (Wa in FIG. 10A) is greater than the width dimension between the edges of the protruding portion 84 in the orthogonal direction (both left and right edges in the width direction) and the edges of the opening 84k (both left and right edges in the orthogonal direction), i.e., Wb in FIG. 10A.

Accordingly, the molten solder HD can be dammed up at the wide opening 84k in a sure manner, and consequently, the solder HD can be suppressed from broadly flowing out onto the protruding portion 84 side in a sure manner. The greater then width dimension (Wa) of the opening 84k is, the greater the damming effect of solder HD is, but the thermal conduction effect from the protruding portion 84 to the wire fixing portion 64 deteriorates, so the balance in the width dimensions (Wa and Wb) is decided appropriately, taking these effects into consideration. Note that in the first embodiment according to the present invention, the width dimension (Wa) of the opening 84k in the orthogonal direction is set so as to be smaller than that obtained by subtracting the width dimension (Wa) of the opening 84k from the width dimension of the protruding portion 84 at the portion where the opening 84k is formed (Wb+Wa+Wb), that is to say, smaller than the dimension (Wb+Wb).

The width of a connecting portion between the penetrated portion 64k and the opening 84k may be narrower than the width of the protruding portion 84 (width in the orthogonal direction) at the portion situated further inward from the opening 84k in the first embodiment of the present invention, as illustrated in FIG. 10A. Accordingly, the external shape (footprint) of a solder fillet formed centered on the suspension wire 5 is restricted by the narrow portion. Accordingly, the solder fillet can be prevented from spreading over a wide area, and variance in the amount of solder at the wire fixing portion 64 can be reduced. Note that the portion situated between the penetrated portion 64k and the opening 84k is part of the wire fixing portion 64, as illustrated in FIGS. 10A and 10B.

Moreover, variance in the amount of solder at the wire fixing portion 64 can be reduced, so the shape of the solder adhesion region formed on the bottom side (back side) through the penetrated portion 64k (back fillet) can be stabilized. Accordingly, variance in the influence of solder HD on the suspension wire 5 can be suppressed, and the effective length of the suspension wire 5 dependent on spring properties thereof can be stabilized. Thus, image stabilization characteristics can be stabilized.

Further, the dimensions from the inner side edge of the opening 84k to the tip of the protruding portion 84 in the protruding direction are greater than the dimensions between the penetrated portion 64k and the opening 84k, as illustrated in FIG. 10A. Accordingly, a sufficient area for irradiation by laser can be secured on the inward side from the protruding portion 84, and the laser irradiation portion can be irradiated by the laser beam in a sure manner.

Next, the lower leaf spring 4C of the biasing member 4 is configured including multiple (four in the first embodiment of the present invention) third portions 34 fixed to the lens holding member 2, as illustrated in FIGS. 7B and 8B, multiple (four in the first embodiment of the present invention) fourth portions 44 situated on the outer peripheral side from the third portions 34 and fixed to the lower spring fixing members B26, as illustrated in FIGS. 8B and 9B, four elastic arm portions 54C provided between the third portions 34 and the fourth portions 44, as illustrated in FIG. 8B, and four linking portions R4 connecting the third portions 34. The lower leaf spring 4C is disposed so that the thickness direction thereof is aligned with the optical axis direction KD.

The inner shape of the lower leaf spring 4C is circular, while the outer shape is rectangular, with each being formed substantially in point symmetry centered on the optical axis. Accordingly, the lower leaf spring 4C supports the lens holding member 2 at four equidistant positions which are the third portions 34, and is supported by the lower spring fixing members B26 (fixing member R6) at four equidistant positions which are the fourth portions 44. Thus, the lens holding member 2 can be supported in a well-balanced manner.

When the lens driving device 100 is assembled, the third portions 34 and the recesses 32r (see FIG. 7A) of the lens holding member 2 are made to face each other, with these portions being fixed by adhesive agent. Also, protrusions B26t (described later) of the lower spring fixing members B26 are inserted through through holes (see FIG. 8B) formed in the four fourth portions 44, with these portions being fixed by adhesive agent. Accordingly, the biasing member 4 formed as described above supports the lens holding member 2 so as to be capable of moving in the optical axis direction KD.

Next, as illustrated in FIG. 9A, the upper spring fixing members B16 of the movable unit KU are preferably provided integrally with the upper side of the fixing member R6 (specifically, the upper face of a later-described frame portion 56), where the other side of the upper leaf spring 4A (second portions 24) is fixed, as described above. In the same way, as illustrated in FIG. 9B, the lower spring fixing members B26 of the movable unit KU are preferably provided integrally with the lower side of the fixing member R6, where the other side of the lower leaf spring 4C (fourth portions 44) is fixed, as described above.

Figure 12A:
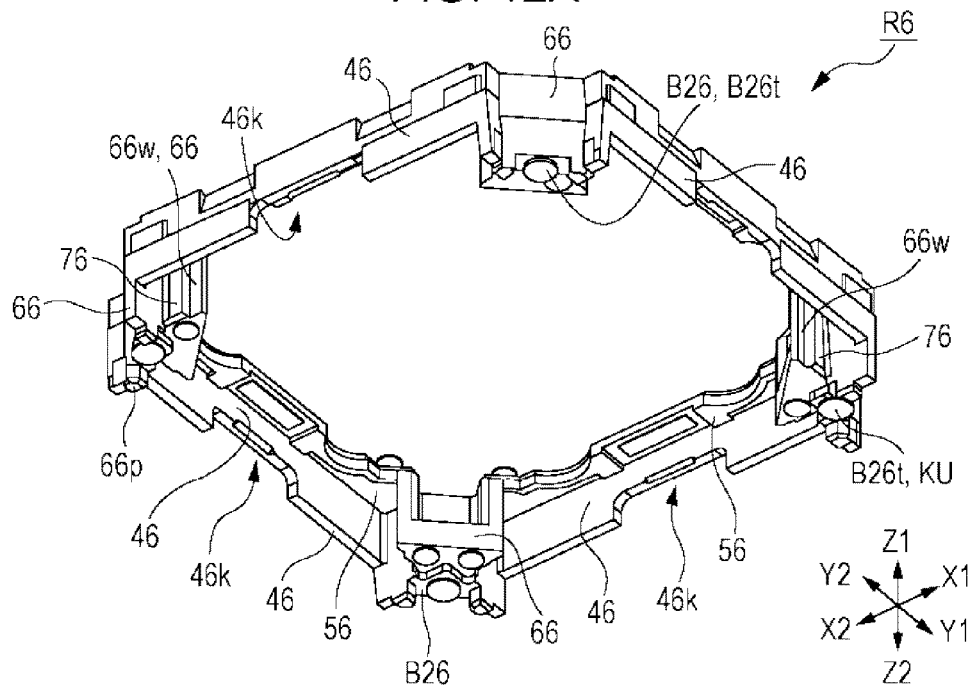
FIGS. 12A and 12B are diagrams for describing the first driving mechanism of the lens driving device according to the first embodiment of the present invention, FIG. 12A being a lower perspective view illustrating the fixing member, and FIG. 12B being a lower perspective view illustrating the permanent magnets mounted to the fixing member.
Figure 12B:
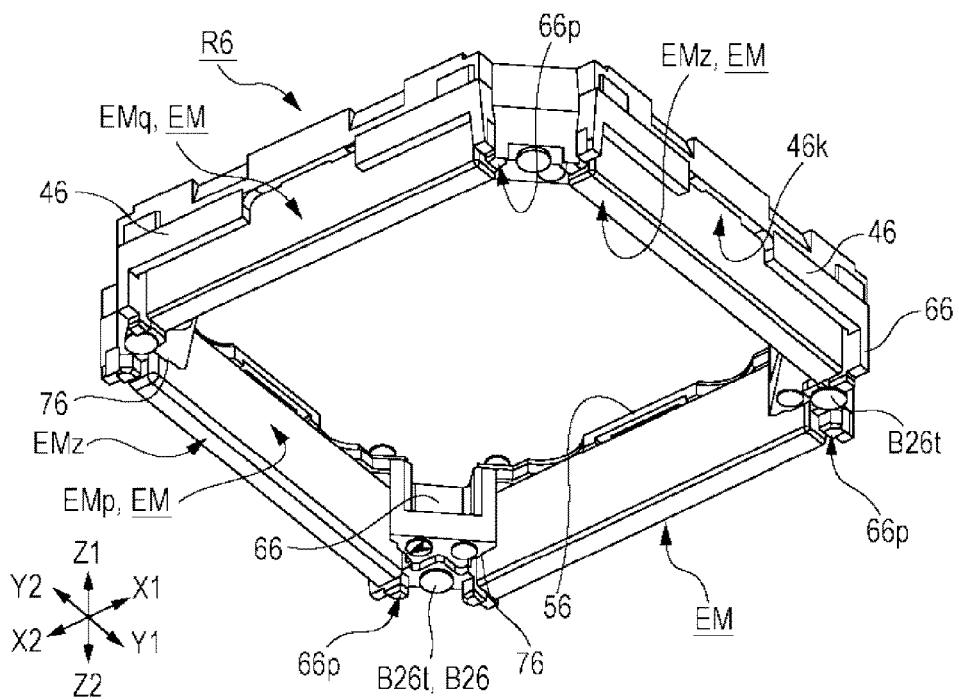
Figure 13:
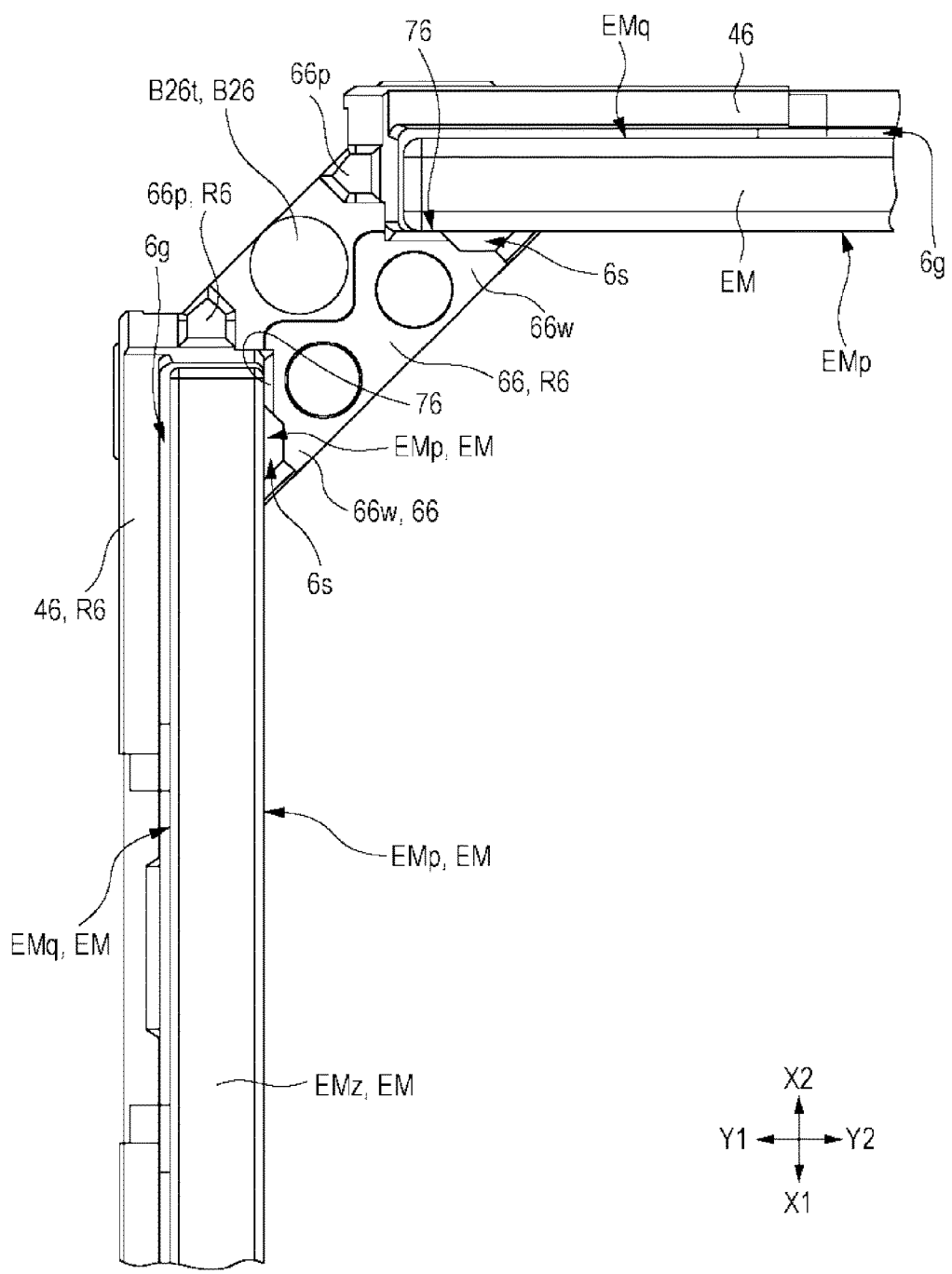
FIG. 13 is an enlarged bottom view of a portion XIII in FIG. 11B, for describing the first driving mechanism of the lens driving device according to the first embodiment of the present invention.

Next, the first driving mechanism D1 of the movable unit KU will be described. FIGS. 11A and 11B are diagrams for describing the first driving mechanism D1, FIG. 11A being a bottom view where the lens holding member 2 and biasing member 4 illustrated in FIG. 4B have been omitted from illustration, and FIG. 11B is a bottom view illustrating only permanent magnets EM and the fixing member R6 illustrated in FIG. 11A. FIGS. 12A and 12B are diagrams for describing the first driving mechanism D1, FIG. 12A being a lower perspective view of the fixing member R6 and FIG. 12B being a lower perspective view illustrating the permanent magnets EM mounted to the fixing member R6. FIG. 13 is an enlarged bottom view of a portion XIII in FIG. 11B.

The first driving mechanism D1 of the movable unit KU has functions of moving the lens holding member 2 in the optical axis direction KD (Z direction in FIG. 2), and is configured including the first coil 13 wound and fixed on the perimeter of the lens holding member 2, the four permanent magnets EM disposed facing the outer side of the first coil 13, and the fixing member R6 to which the four permanent magnets EM are fixed.

First, the first coil 13 of the first driving mechanism D1 is formed of metal wire covered (coated) on the outside with an insulator, and is formed by being wound on the perimeter of the lens holding member 2, as illustrated in FIG. 7B. At this time, the first coil 13 is disposed between the eaves portion 22 and the flange portion 32 as illustrated in FIG. 7B, facing inner faces EMp of the four permanent magnets EM (the faces of the permanent magnets EM facing toward the first coil 13) across a space, as illustrated in FIG. 11A.

The first coil 13 is formed in the shape of an octagonal ring as illustrated in FIG. 11A, having four extending portions 13q that extend facing the inner faces EMp of the permanent magnets EM, and bent portions 13r that connect between the adjacent extending portions 13q. Although the first coil 13 actually has a shape of wound wires having been bundled, this has been simplified in FIGS. 1, 4B, 7B, and 11A, to show the surface as being smooth.

Both ends of the wound metal wire of the first coil 13 are electrically conductive, and both ends of the coil are soldered and electrically connected to each of the upper leaf spring 4A as illustrated in FIG. 5A, as described above.

Four neodymium magnets are used for the permanent magnets EM of the first driving mechanism D1, each having a slender plate shape as illustrated in FIGS. 11A, 11B, and 12B. The permanent magnets EM have the inner face EMp extending in the longitudinal direction facing the first coil 13 side, and outer face EMq extending in the longitudinal direction facing the opposite direction from the inner face EMp. The permanent magnets EM are fixed to the fixing member R6 with parallel pairs being orthogonally arranged so as to surround the optical axis. The inner face EMp and outer face EMq of the permanent magnets EM have been magnetized to different magnetic poles.

Next, the fixing member R6 of the first driving mechanism D1 is formed as a frame in a generally rectangular shape in plan view as illustrated in FIGS. 11A and 11B, using a liquid polymer (LCP) that is a type of synthetic resin material. The fixing member R6 is configured including facing wall portions 46 that face the outer faces EMq of the permanent magnets EM, the frame portion 56 that is formed orthogonally to the facing wall portions 46 and makes up the upper face, extending portions 66 that are formed on the four corners and protrude downwards from the frame portion 56, and positioning portions 76 that are capable of coming into contact with the inner faces EMp of the permanent magnets EM. The four permanent magnets EM are mounted to the fixing member R6 as illustrated in FIGS. 11A and 11B, with the inner faces EMp of the permanent magnets EM and the positioning portions 76 being arrayed in contact, and positioned to the fixing member R6 in a state of having been positioned by the positioning portions 76.

Accordingly, the permanent magnets EM are fixed to the fixing member R6 in a state of the inner faces EMp of the permanent magnets EM in contact with and positioned by the positioning portions 76 of the fixing member R6. Thus, even if there is variance in the thickness of the permanent magnets EM, variance in distance between the inner faces EMp of the permanent magnets EM and the first coil 13 is suppressed, and the permanent magnets EM are disposed in a precise manner. Accordingly, the magnetic force of the permanent magnets EM acting on the permanent magnets EM is stabilized, and thrust for moving the lens holding member 2 in the optical axis direction KD is also stabilized.

The facing wall portions 46 of the fixing member R6 are formed between adjacent extending portions 66 in a continuous manner, forming the perimeter of the four sides of the fixing member R6 as illustrated in FIG. 12A. Accordingly, the strength of the fixing member R6 fixing the permanent magnets EM can be increased. This suppresses deformation of the fixing member R6, so the permanent magnets EM can be disposed in a precise manner.

The facing wall portions 46 each have a notch 46k at the middle portion thereof, as illustrated in FIG. 12A. The notches 46k can be used to easily apply adhesive agent to the permanent magnets EM and fixing member R6 and to externally irradiate the adhesive agent (ultraviolet curable) with ultraviolet rays to harden the adhesive agent, even after the permanent magnets EM have been set in the fixing member R6 (see FIG. 12B). This facilitates assembly when manufacturing the lens driving device 100.

When the permanent magnets EM are placed in the fixing member R6, the facing wall portions 46 face the outer faces EMq of the permanent magnets EM in the first embodiment of the present invention, as illustrated in FIG. 11B, with a first gap 6g formed between the outer faces EMq and the facing wall portions 46, as illustrated in FIG. 13. Adhesive agent is provided in this first gap 6g, thereby fixing the permanent magnets EM and the fixing member R6 by adhesion. Thus, the permanent magnets EM and the fixing member R6 can be fixed by adhesion at a wide area portion of the outer faces EMq and the facing wall portions 46. The permanent magnets EM can thus be powerfully fixed to the fixing member R6, and the permanent magnets EM can be prevented from coming loose from the fixing member R6 even if subjected to strong shock, such as being dropped or the like.

The frame portion 56 of the fixing member R6 is formed in a rectangular shape on a plane orthogonal to the facing wall portions 46, and makes up the upper face of the fixing member R6, as illustrated in FIGS. 1 and 12A. As described above, the facing wall portion 46 are formed extending downwards from the four sides of the frame portion 56, with the extending portions 66 protruding downwards from the four corners of the frame portion 56. Note that in the first embodiment of the present invention, the facing wall portions 46, frame portion 56, and extending portions 66, are formed as an integrated and continuous article.

As described earlier, the upper spring fixing members B16 are provided at the four corners of the frame portion 56, on the upper face thereof, and the second portions 24 of the upper leaf spring 4A are fixed to the fixing member R6 in a state where the protrusions B16t of the upper spring fixing members B16 are inserted through the through holes formed in the other side (second portions 24) of the upper leaf spring 4A, as illustrated in FIG. 9A. Although omitted from illustration, a second gap is formed between an upper face EMa of the permanent magnet EM (see FIG. 1) and the frame portion 56 of the fixing member R6 when disposing the permanent magnets EM in the fixing member R6 according to the first embodiment of the present invention.

Next, the extending portions 66 of the fixing member R6 are formed protruding downwards form the four corners of the frame portion 56, and extend following the optical axis direction KD, as illustrated in FIG. 5A. The extending portions 66 are provided with positioning portions 76 formed in parallel with the facing wall portions 46, as illustrated in FIGS. 11A through 12A.

In the first embodiment of the present invention, the extending portions 66, frame portion 56, facing wall portion 46, and positioning portion 76 together form an accommodation space with four sides closed off (and two open). This accommodation space accommodates part of the permanent magnets EM specifically, both ends in the longitudinal direction of the permanent magnets EM (directions orthogonal to the optical axis direction KD, the X and Y directions in FIGS. 11A and 11B) when placing the permanent magnets EM in the fixing member R6. The inner faces EMp at both ends in the longitudinal direction of the permanent magnets EM abut the positioning portions 76. Accordingly, the permanent magnets EM are positioned by the points on the inner faces EMp at both ends in the longitudinal direction thereof, so positional deviation is suppressed. Thus, precision in positioning of the permanent magnets EM and the first coil 13 is more readily realized.

The extending portions 66 each are configured having a lower face 66p that is at the same height position in the optical axis direction KD as a lower face EMz of the permanent magnets EM, as illustrated in FIG. 5B. Accordingly, the permanent magnets EM can be disposed in a precise manner using the lower faces 66p of the extending portions 66 and the lower faces EMz of the permanent magnets EM as references, even if there are variances in the dimensions of the permanent magnets EM in the optical axis direction KD (height direction). Moreover, the second gap is provided between the upper faces EMa of the permanent magnets EM and the frame portion 56 of the fixing member R6, so dimensional variance of the permanent magnets EM can be absorbed by this second gap.

As described above, the lower spring fixing members B26 are provided to the lower side of the extending portions 66, and the other side of the lower leaf spring 4C (fourth portions 44) has protrusions B26t of the lower spring fixing members B26 inserted therethrough as illustrated in FIG. 9B, thereby being fixed to the fixing member R6.

Next, as described above, two of the positioning portions 76 of the fixing member R6 are provided to each of the extending portions 66, as illustrated in FIGS. 11A and 11B. Each of one positioning portion 76 of adjacent extending portions 66 comes into contact with the inner face EMp of one permanent magnet EM. The two positioning portions 76 are provided at positions on the outer side of the extending direction of the extending portions 13q of the first coil 13, that is, at positions at the side of the bent portions 13r of the first coil 13. Accordingly, the permanent magnets EM directly face the extending portions 13q of the first coil 13 over the entire length thereof. Accordingly, thrust in the optical axis direction KD can be realized by the first driving mechanism D1 in a sure manner.

The positioning portions 76 are configured with a length in the optical axis direction KD that is greater than the length dimensions of the facing wall portions 46 in the optical axis direction KD, as illustrated in FIG. 12A. Accordingly, the facing wall portions 46 can be formed smaller and thinner, without affecting the positioning precision of the permanent magnets EM. This enables the outer shape of the fixing member R6 to be reduced, and consequently enables the lens driving device 100 to be made smaller. Moreover, the permanent magnets EM can be easily mounted from the outside when assembling the permanent magnets EM to the fixing member R6.

Extending walls 66w extending in parallel as to the facing wall portions 46 are formed at positions inward from the positioning portions 76, so that third gaps 6s are formed between the extending walls 66w and inner faces EMp of the permanent magnets EM when the permanent magnets EM are assembled to the fixing member R6, as illustrated in FIG. 13. Adhesive agent is provided in the third gaps 6s so as to fix the permanent magnets EM and fixing member R6 by adhesion. The permanent magnets EM can thus be powerfully fixed to the fixing member R6, and the permanent magnets EM can be prevented from coming loose from the fixing member R6 even if subjected to strong shock, such as being dropped or the like.

Thus, the movable unit KU is configured with each of the lens holding member 2, biasing member 4 (upper leaf spring 4A and lower leaf spring 4C), first driving mechanism D1 (first coil 13, permanent magnets EM, fixing member R6) each being disposed, so magnetic force generated by current being applied to the first coil 13 from the power source via the upper leaf spring 4A causes thrusts to act on the first coil 13 in the direction in which the current flows, and the lens holding member 2 moves vertically. Moreover, the permanent magnets EM are disposed at the four sides so as to surround the otpical axis (first coil 13) in the first embodiment of the present invention, so driving force in the optical axis direction KD created by the first coil 13 and permanent magnets EM can be made to act on the lens holding member 2 in a well-balanced manner.

Next, the suspension wires 5 of the lens driving device 100 will be described. The suspension wires 5 are formed using a metal material that has electroconductivity and excellent elasticity. The upper end of each is soldered to the upper leaf spring 4A (wire fixing portion 64) and the lower end of each is soldered to the base member 7 (later-described plated metal portion 7m). The suspension wires 5 support the movable unit KU via the upper leaf spring 4A so as to be movable in the direction orthogonal to the optical axis direction KD (intersecting direction CD). A metal material such as copper alloy or the like, for example, is used. The cross-section is a circular shape around 50 μm in diameter, and the effective length contributing to elasticity is around 3 mm.

Figure 14A:
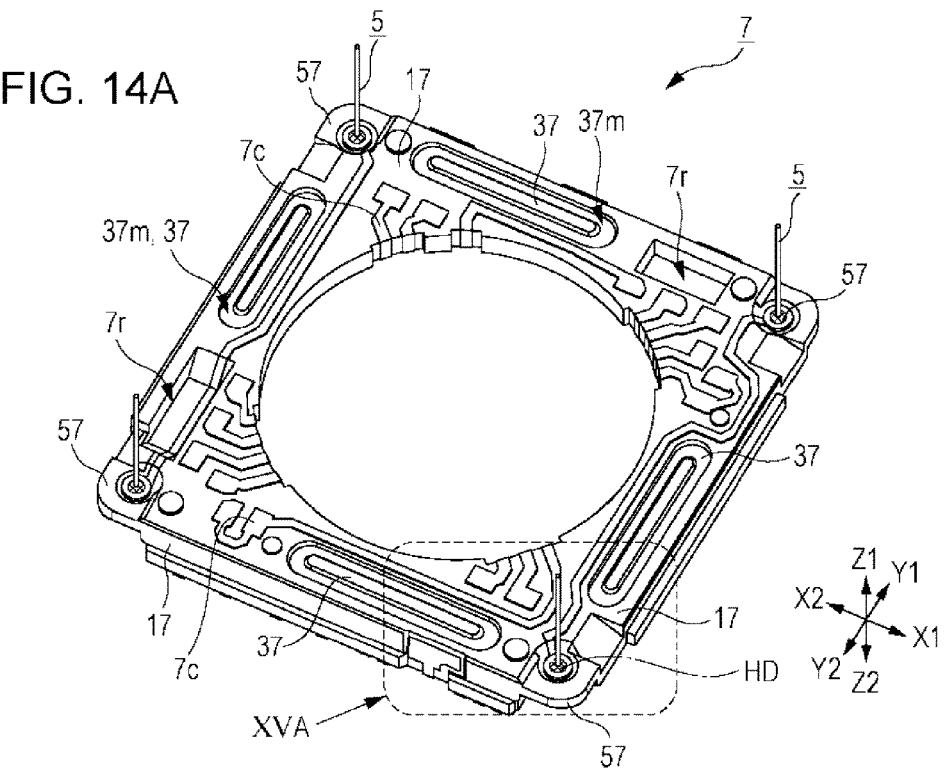
FIGS. 14A and 14B are diagrams for describing a base member of the lens driving device according to the first embodiment of the present invention, FIG. 14A being an upper perspective view where suspension wires are mounted to the base member, and FIG. 14B being a lower perspective view of the configuration in FIG. 14A from below.
Figure 14B:
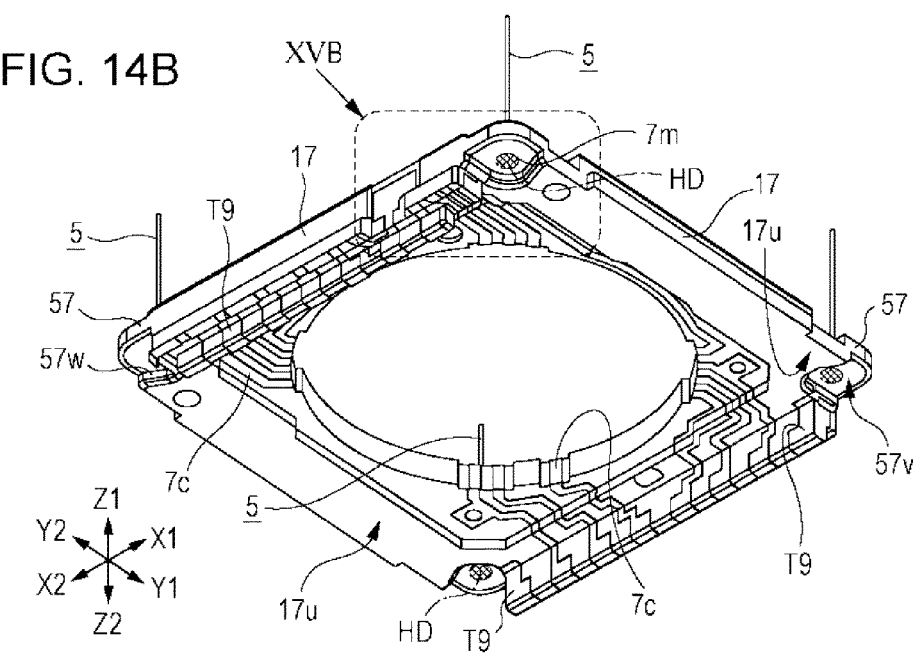
Figure 15A:
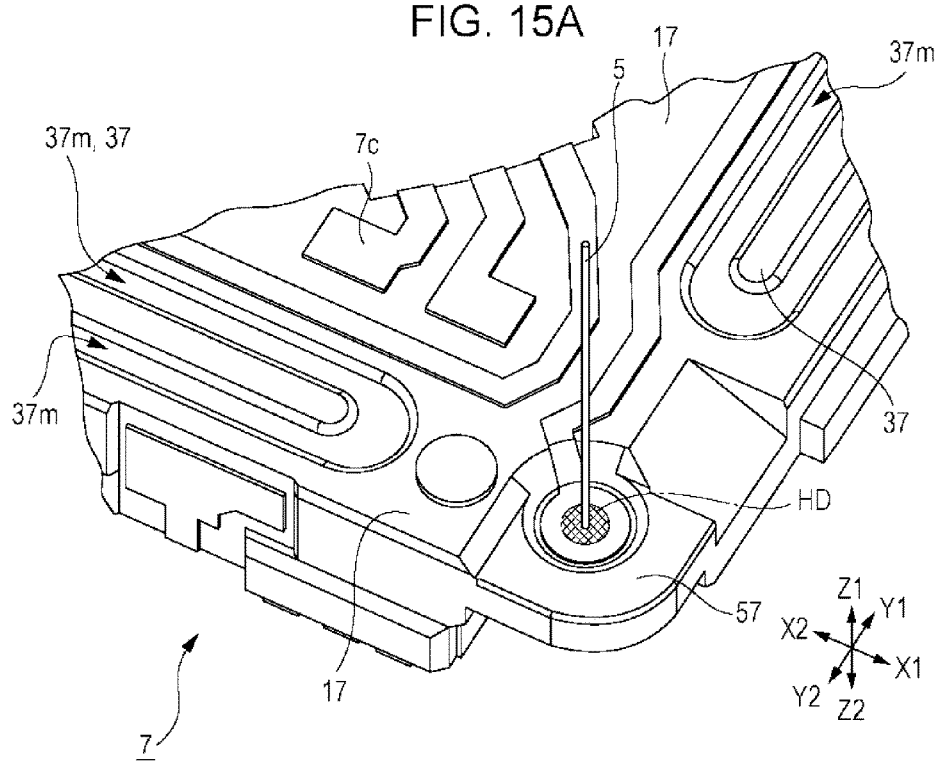
FIGS. 15A and 15B are diagrams for describing the base member of the lens driving device according to the first embodiment of the present invention, FIG. 15A being an enlarged upper perspective view of a portion XVA in FIG. 14A, and FIG. 15B being an enlarged lower perspective view of a portion XVB in FIG. 14B.
Figure 15B:
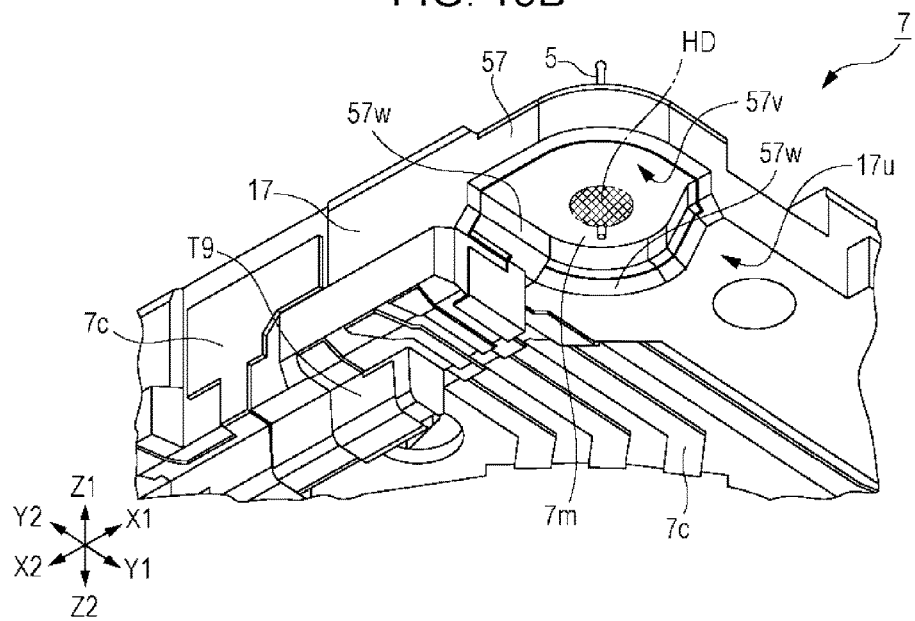
Figure 16A:
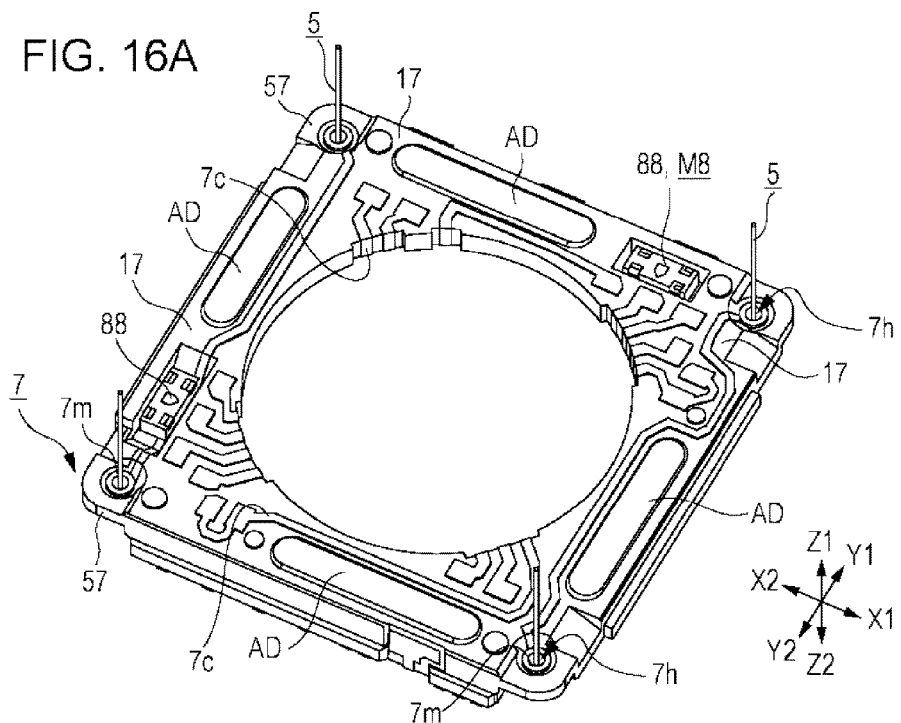
FIGS. 16A and 16B are diagrams for describing the base member of the lens driving device according to the first embodiment of the present invention, FIG. 16A being an upper perspective view illustrating magnetism detecting members and adhesive agent illustrated in FIG. 14A, and FIG. 16B being an upper perspective view where the multi-layer board has been disposed in the configuration in FIG. 16A.
Figure 16B:
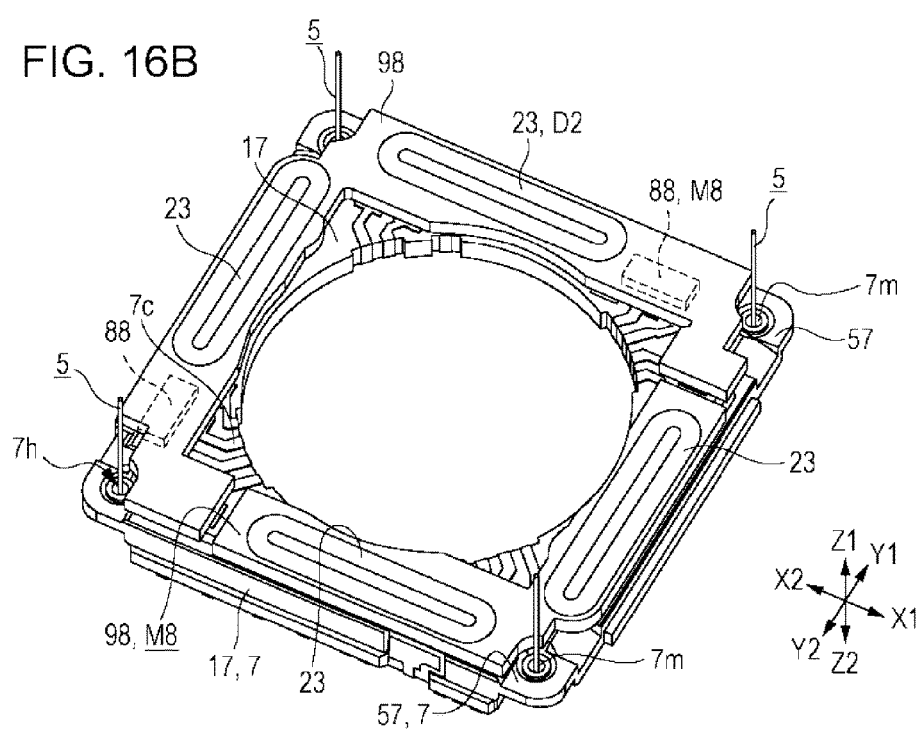

Next, the base member 7 of the lens driving device 100 will be described. FIGS. 14A and 14B are diagrams for describing the base member 7. FIG. 14A is an upper perspective view where suspension wires 5 are mounted to the base member 7, and FIG. 14B is a lower perspective view of the configuration in FIG. 14A from below. FIG. 15A is an enlarged upper perspective view of a portion XVA in FIG. 14A, and FIG. 15B is an enlarged lower perspective view of a portion XVB in FIG. 14B. Note that solder HD where the lower ends of the suspension wires 5 and the base member 7 (plated metal portion 7m) have been soldered are schematically illustrated by cross-hatching indicated by single-dot lines in FIGS. 14A through 15B, to facilitate description. FIG. 16A is an upper perspective view illustrating magnetism detecting members 88 and adhesive agent (indicated by AD) on the base member 7 in FIG. 14A, and FIG. 16B is an upper perspective view where the multi-layer board 98 has further been disposed in the configuration in FIG. 16A. The magnetism detecting members 88 mounted to the rear face (lower face) of the multi-layer board 98 are indicated by dashed lines in FIG. 16B.

The base member 7 of the lens driving device 100 is fabricated by injection molding, using a liquid crystal polymer (LCP) or the like that is the same type of synthetic resin material used for the lens holding member 2 and the fixing member R6. The base member 7 is formed as a plate having a rectangular outer shape, and the inner portion has a ring shape, having a circular opening at the middle portion thereof, as illustrated in FIGS. 14A and 14B. The base member 7 has a base portion 17, adhesive agent distribution portions 37 provided on the upper face of the base member 7, and thin portions 57 located at the corners of the base member 7.

First, the base portion 17 is provided with electroconductive portions 7c three-dimensionally laid on the upper face, lower face 17u, and side faces, as illustrated in FIGS. 14A through 15B. The electroconductive portions 7c are electrically connected to second coils 23 disposed on the later-described multi-layer board 98.

Two recesses 7r that are recessed downwards are provided on the upper face side of the base member 7, as illustrated in FIG. 14A, the recesses 7r accommodating the magnetism detecting members 88 mounted to the multi-layer board 98, as illustrated in FIG. 16A. Accordingly, the lens driving device 100 can be formed lower by an amount equivalent to the thickness (height) of the magnetism detecting members 88.

Multiple terminals T9 for connecting to an external device are provided on the lower face 17u side of the base member 7, as illustrated in FIG. 14B. Each of the terminals T9 is electrically connected to an electrode land of a mounting board to which an imaging device, omitted from illustration, is mounted. Electric power and the like can be supplied from electrode lands of the mounting board, and signals from the magnetism detecting members 88 (detecting unit M8) can be extracted. Electrode lands can also be used for grounding. Specifically, the terminals T9 are electrically connected to the first coil 13 of the first driving mechanism D1 via the electroconductive portions 7c, suspension wires 5, and upper leaf spring 4A, and also are electrically connected to the second coils 23 of the second driving mechanism D2 via the electroconductive portions 7c and multi-layer board 98. The terminals T9 are also electrically connected to the magnetism detecting members 88 via the electroconductive portions 7c and multi-layer board 98.

Next, four adhesive agent distribution portions 37 of the base member 7 are provided on the upper face of the base portion 17 as illustrated in FIG. 14A, and each have an annular groove 37m formed around. Adhesive agent (AD) is applied to the adhesive agent distribution portions 37, as illustrated in FIG. 16A. The multi-layer board 98 is then loaded on the upper face of the base member 7 as illustrated in FIG. 16B, so that the multi-layer board 98 is fixed to the base member 7 by the adhesive agent (AD). At this time, the adhesive agent distribution portions 37 are positions corresponding to each of the second coils 23 provided on the multi-layer board 98. This prevents the parts where the second coils 23 are provided from floating up, so the distance between the second coils 23 and the permanent magnets EM can be maintained at an appropriate distance. The adhesive agent distribution portions 37 have the annular grooves 37m formed around, so excessive adhesive agent (AD) is accommodated in the annular grooves 37m when fixing the multi-layer board 98 and base member 7 by adhesion. Accordingly, the adhesion can be performed with an appropriate thickness of the adhesive agent (AD), and adhesive agent (AD) does not readily leak to the outside of the multi-layer board 98.

The thin portions 57 of the base member 7 are formed with a smaller thickness dimension (dimension in the Z direction) than the base portion 17, as illustrated in FIGS. 14A through 16B. Lower faces 57v of the thin portions 57 are situated higher than (Z1 direction in FIG. 5B) the lower face 17u of the base portion 17 as illustrated in FIGS. 5B and 15B, and the thin portions 57 (lower faces 57v) and the base portion 17 (lower face 17u) are connected in a stepped manner, as illustrated in FIG. 15B. That is to say, stepped portions are provided between the lower faces 57v of the thin portions 57 and the lower face 17u of the base portion 17.

Wall portions 57w forming these stepped portions are provided facing the thin portions 57. The wall portions 57w have perpendicular walls formed perpendicularly (approximately 90°) to the lower faces 57v of the thin portions 57. Note that the lower faces 57v of the thin portions 57 and the lower face 17u of the base portion 17 may be connected by partially tapered faces.

The thin portions 57 each have a through hole 7h through which a suspension wire 5 is passed, and a plated metal portion 7m formed of a metal film formed around the through hole 7h and on the inner face of the through hole 7h, as illustrated in FIGS. 16A and 16B. The term "around the through hole 7h" includes the lower face 57v and upper face of the thin portion 57 adjacent to the through hole 7h. It is sufficient for the plated metal portion 7m around the through hole 7h to be formed on at least the lower face 57v of the thin portion 57, but in the first embodiment of the present invention, is formed on both the lower face 57v and upper face of the thin portion 57.

The same metal film as that of the plated metal portion 7m is formed on the entire face of the lower face 57v of the thin portion 57, and the same metal film as that of the plated metal portion 7m is formed on the wall portion 57w as well. The metal film of the lower face 57v is continuous with the metal film formed on the entire region of the wall portion 57w.

The suspension wire 5 is inserted into the through hole 7h, and the lower end of the suspension wire 5 is soldered to the plated metal portion 7m. Accordingly, the suspension wire 5 is fixed to the base member 7.

The base member 7 has more rigidity as compared to FPC board, and accordingly, the suspension wires 5 are fixed to the base member 7 more securely than to the film FPC board 933 according to the conventional example. This enables the suspension wires 5 to be supported in a stable manner, and control in the intersecting direction intersecting the optical axis direction KD for image stabilization can be performed in a stable manner. Note that the base member 7 functions as a supporting member supporting the lower end of the suspension wires 5. Also note that the thin portions 57 are referred to as "thin portions" since the thickness dimension is smaller than that of the base portion 17, but are formed to a thickness having sufficient rigidity to support the suspension wires 5 of which the upper ends are soldered to the upper leaf spring 4A.

By soldering on this plated metal portion 7m, an upper solder fillet is formed surrounding the suspension wire 5 above the through hole 7h as illustrated in FIG. 15A, and also a lower solder fillet is formed surrounding the suspension wire 5 below the through hole 7h as illustrated in FIG. 15B. Note that the upper solder fillet is formed smaller than the lower solder fillet, although this is not illustrated in particular. Accordingly, the effective length contributing to spring properties of the suspension wire 5, supporting the movable unit KU disposed above the base member 7, can be made to be longer. Accordingly, spring properties are improved, and product capabilities can be improved.

The through hole 7h is provided in the thin portions 57 formed with smaller thickness dimension than the base portion 17 as described above, so the surface area of the plated metal portion 7m formed on the inner face of the through hole 7h can be reduced. This enables the amount of solder HD loaded to the inner face of the through hole 7h to be reduced, thereby reducing the amount of heat to be applied to the solder HD when soldering. Thus, damage of the base member 7 can be suppressed. Further, the solder fillets (upper solder fillet and lower solder fillet) are formed on this thin portion 57, so the solder fillets can be contained within the thickness dimension of the base portion 17. This enables the overall thickness to be reduced.

The same metal film as that of the plated metal portion 7m is formed on the entire face of the lower face 57v of the thin portion 57 and on at least the perpendicular wall portion of the wall portion 57w in the first embodiment of the present invention. Accordingly, when soldering the lower end of the suspension wire 5, even if flux or solder HD does scatter and strike the lower face 57v and wall portion 57w when irradiating by a laser beam for example, the synthetic resin material making up the base member 7 of the lower face 57v and wall portion 57w can be prevented from scorching. Further, even if the laser beam that has struck the solder paste or solder HD irregularly scatters and partially strikes the wall portion 57w, the synthetic resin material making up the wall portion 57w of the base member 7 can be prevented from scorching.

The lower face 57v and wall portion 57w have the metal film formed, and accordingly heat can be dissipated from these portions. Further, the metal film is continuous from the wall portion 57w to the terminal portion formed at the base portion 17 (and in cases up to the terminal T9), whereby excess heat can be dissipated by the metal film and terminal at these portions. Accordingly, the amount of heat applied to the thin portions 57 can be reduced, further suppressing damage to the base member 7.

The outmost layer of the metal film is formed of gold in the first embodiment of the present invention. Gold does not readily corrode and has excellent environment resistance, for example, and also is well-suited to soldering. A second film made up of nickel and copper is formed beneath the gold layer in the metal film according to the first embodiment of the present invention.

When soldering by laser irradiation, the reflectance of the laser beam by gold is high (approximately 95%), so even in a case where the laser beam that has struck the solder HD irregularly scatters and partially strikes the lower face 57v or wall portion 57w of the thin portion 57, the laser can be reflected in a sure manner. This enables the amount of heat applied to the thin portions 57 and wall portion 57w to be reduced even more, even further suppressing damage to the base member 7.

Figure 17A:
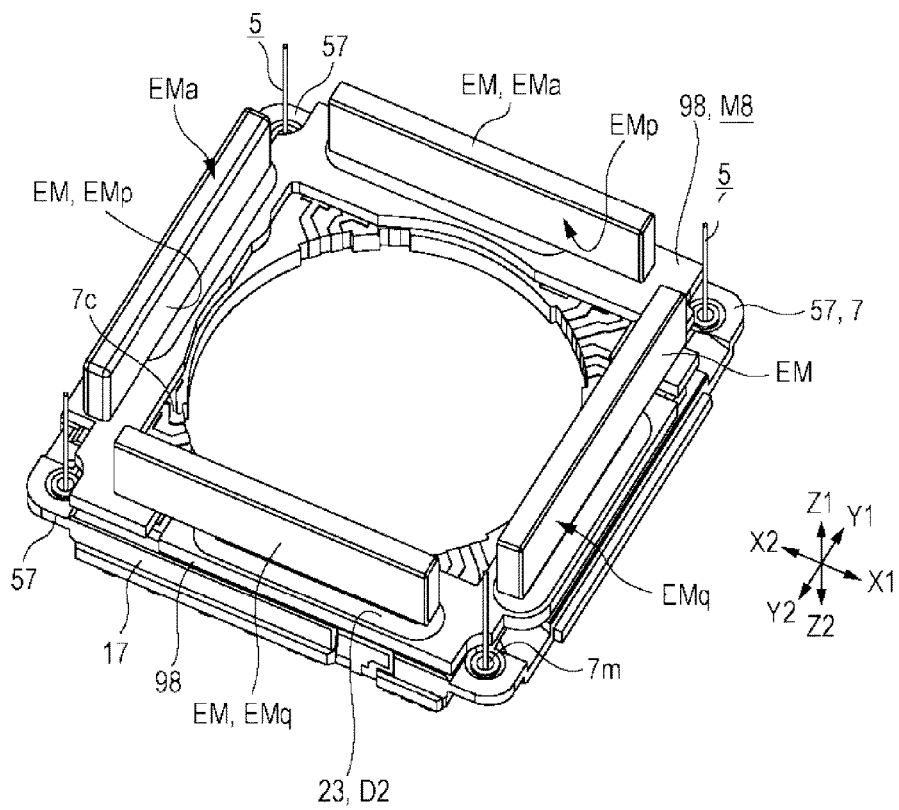
FIGS. 17A and 17B are diagrams for describing a second driving mechanism of the lens driving device according to the first embodiment of the present invention, FIG. 17A being an upper perspective view where the permanent magnets have been mounted to the configuration in FIG. 16B, and FIG. 17B being a rear view where the configuration in FIG. 17A is viewed from the Y1 side.
Figure 17B:
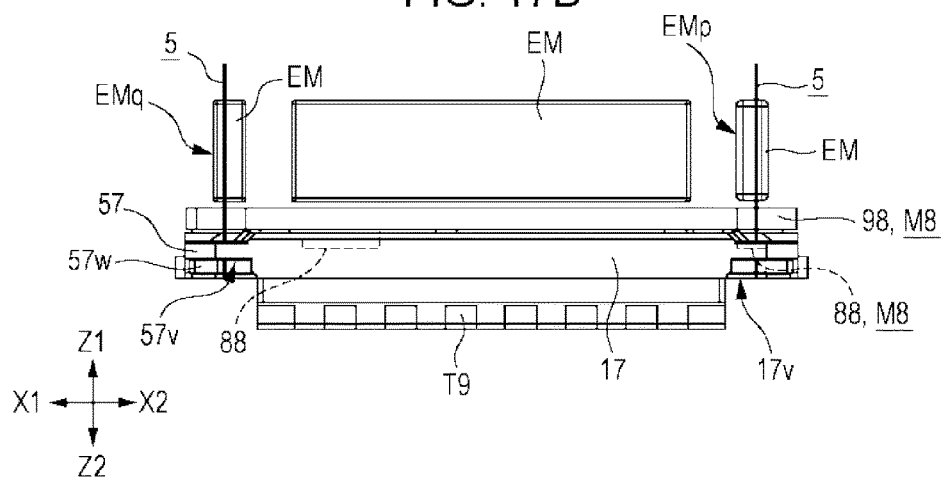

Next, the second driving mechanism D2 of the lens driving device 100 will be described. FIGS. 17A and 17B are diagrams for describing the second driving mechanism D2. FIG. 17A is an upper perspective view where the permanent magnets EM have been mounted to the configuration in FIG. 16B, and FIG. 17B is a rear view where the configuration in FIG. 17A is viewed from the Y1 side. Note that the magnetism detecting members 88 mounted to the rear side (lower face) of the multi-layer board 98 are illustrated by dotted lines in FIG. 17B.

The second driving mechanism D2 of the lens driving device 100 is configured primarily having the four permanent magnets EM used in the first driving mechanism D1 as well, and the four second coils 23 disposed below the four permanent magnets EM across a space, as illustrated in FIGS. 17A and 17B. The second driving mechanism D2 has functions of using magnetic force generated by electric current flowing from a power source of an external device to the second coils 23 via the terminals T9, and magnetic fields generated by the permanent magnets EM, to move the movable unit KU the intersecting direction CD (direction intersecting the optical axis direction KD). The permanent magnets EM have been described earlier, so detailed description will be omitted here.

The second coils 23 of the second driving mechanism D2 are provided on the multi-layer board 98 as illustrated in FIG. 16B. Multiple layers of spiral coil patterns are formed using this multi-layer board 98 where multiple electroconductive layers have been formed. The multi-layer board 98 is fixed to the base member 7 as described above, so the multiple second coils 23 are supported by the base member 7. Interconnection among the patterns formed in the layers is carried out by through holes, needless to say. The second coils 23 electrically conduct with electrode terminals (omitted from illustration) formed on the lower face of the multi-layer board 98, these electrode terminals and electroconductive portions 7c of the base member 7 being soldered together and thus electrically connected.

The second coils 23 are shaped having a longitudinal direction in a direction following each of the sides of the rectangular-shaped multi-layer board 98, as illustrated in FIG. 16B. When the lens driving device 100 is assembled, the four second coils 23 are disposed facing the four permanent magnets EM, and the longitudinal directions of the permanent magnets EM and the longitudinal directions of the second coils 23 are aligned, as illustrated in FIG. 17A.

The longitudinal directions of the four second coils 23 are disposed such that the longitudinal directions of adjacent second coils 23 are orthogonal to each other, as illustrated in FIG. 16B. That is to say, one pair of second coils 23 facing each other across the lens holding member 2 is disposed in a direction parallel to the X direction, and the other pair of second coils 23 is disposed in a direction parallel to the Y direction. Accordingly, the movable unit KU can be moved in the X direction and Y direction by applying current to the respective pairs of second coils 23.

The second coils 23 are provided such that each of the pairs across the lens holding member 2 are of the same size and in point symmetry in plan view from the optical axis direction KD, as illustrated in FIG. 16B. Accordingly, when current is applied to the second coils 23, no force is generated that would rotate the movable unit KU, and the movable unit KU can be driven in directions intersecting the otpical axis (intersecting direction CD) in a well-balanced and appropriate manner.

Also, the lower faces EMz of the permanent magnets EM are precisely disposed with the lower faces 66p of the fixing member R6 (extending portions 66) as a reference as described above, so variance in distance between the second coils 23 formed on the multi-layer board 98 fixed to the base member 7 and the lower faces EMz of the permanent magnets EM is suppressed. Accordingly, magnetic force acting on the permanent magnets EM from the second coils 23 is stable. Thus, variance in thrust in the intersecting direction CD can be suppressed, and the movable unit KU can be driven in a stable manner.

Next, the detecting unit M8 of the lens driving device 100 will be described. The detecting unit M8 is configured including two of the four above-described permanent magnets EM, the magnetism detecting members 88 that detect magnetic fields generated by the permanent magnets EM (detecting magnets), and the multi-layer board 98 on which the magnetism detecting members 88 are mounted, as illustrated in FIG. 1. The detecting unit M8 has functions of detecting the position of the movable unit KU in directions intersecting the optical direction KD (intersecting direction CD). The permanent magnets EM have already been described, so detailed description will be omitted here.

First, the magnetism detecting members 88 of the detecting unit M8 uses magnetoresistance effect elements that exhibit change in electric resistance under change in a magnetic field. An example is a giant magnetoresistance (GMR.) element that uses the giant magnetoresistance effect. The magnetism detecting members 88 are packaged with each magnetism detecting member (magnetoresistance effect element) embedded in a thermosetting synthetic resin material, with four terminal portions externally exposed.

Two magnetism detecting elements are used for the magnetism detecting members 88, installed (mounted) on the lower face of the multi-layer board 98 two magnetism detecting members facing two permanent magnets EM across the multi-layer board 98, as illustrated in FIG. 17B. The magnetism detecting members 88 can detect magnetic fields generated by the permanent magnets EM disposed at the movable unit KU side and fixed to the fixing member R6, and detect change in the orientation of the magnetic field due to movement of the movable unit KU in the intersecting direction CD (direction intersecting the optical axis direction KD). At this time, the second coils 23 on the multi-layer board 98 where the magnetism detecting elements are installed on the lower face are connected to conduct with the electroconductive portions 7c of the base member 7, so the FPC board 933 such as in the conventional example is unnecessary. Accordingly, the magnetism detecting elements and the permanent magnets EM can be brought closer together, and the magnetism detecting elements can be installed in the plate-shaped and rigid multi-layer board 98 is a stable manner. Accordingly, detection precision of the magnetism detecting elements can be improved, and control in the direction orthogonal to the optical axis direction KD (intersecting direction CD) can be stabilized.

The magnetism detecting members 88 (magnetism detecting elements) are provided on exponential lines of the longitudinal directions of the two adjacent second coils 23 as illustrated in FIG. 16B, so the magnetism detecting elements are not readily affected by the magnetic fields generated by the second coils 23. If there are the magnetism detecting elements on the lower side of the second coils 23 for example, the magnetism detecting elements are affected by the magnetic fields generated by the current flowing through the second coils 23, and detection precision deteriorates.

Next, the multi-layer board 98 of the detecting unit M8 is formed in a rectangular shape using a multi-layer printed wiring board (PWB), and is configured of two boards disposed so as to face each other across the middle of the lens holding member 2. Accordingly, when fabricating the multi-layer board 98 from a panel, divided boards can be obtained with better yield as compared to a case of a single connected board (ring-shaped board). Accordingly, the count obtained from a single panel can be increased, and the manufacturing cost of the multi-layer board 98 can be reduced.

Two magnetism detecting elements are installed together below one divided multi-layer board 98. Accordingly, when mounting the magnetism detecting members 88 (magnetism detecting elements), mounting does not have to be performed to all boards, just the minimally necessary boards. This can improve production.

The detecting unit M8 configured as described above can detect the position of the movable unit KU, and accordingly the lens holding member 2, in the intersecting direction CD. The lens driving device 100 can then apply current to the second coils 23 based on signal information from the detecting unit M8, and thereby correct the position of the lens holding member 2.

Next, the frame member W9 of the lens driving device 100 will be described. The frame member W9 is a ring-shaped member having a rectangular opening in the middle and having a rectangular shape as illustrated in FIG. 1, formed of a synthetic resin material such as polybutylene terephthalate (PBT) or the like.

A pair of penetrating holes W9k are provided at each of the four corners of the frame member W9 as illustrated in FIG. 1, for a total of eight holes W9k. When the frame member W9 is assembled into the lens driving device 100 the protrusions B16t of the upper spring fixing members B16 are inserted through the holes W9k, as illustrated in FIG. 5A. These portions are fixed by adhesive agent, thereby fixing the other side (second portion 24) of the upper leaf spring 4A, held between the frame member W9 and the upper spring fixing members B16, to the fixing member R6 side.

Finally, the case member H9 of the lens driving device 100 will be described. The case member H9 is fabricated by cutting, raising, or the like, of a metal plate of a non-magnetic metal material. The external shape is that of a box such as illustrated in FIG. 1, having a generally rectangular shape as illustrated in FIG. 3A (in plan view). The case member H9 accommodates by covering the movable unit KU, suspension wires 5, second driving mechanism D2, detecting unit M8, and frame member W9, and is fixed to the base member 7. Note that the case member H9 and base member 7 are fixed by an adhesive agent.

Next, the operations of the lens driving device 100 configured as described above will be described briefly. First, both ends of the first coil 13 are electrically connected to the power supplying terminals T9 via the upper leaf spring 4A, the suspension wires 5, and the electroconductive portions 7c of the base member 7, within the movable unit KU of the lens driving device 100, so electric current can be applied from the terminals T9 to the first coil 13. On the other hand, magnetic fluxes from the permanent magnets EM leave the permanent magnets EM, pass through the first coil 13, and return to the permanent magnets EM.

From this initial state, electric current is applied from one terminal T9 side to the first coil 13, whereby electromagnetic force heading from the Z1 direction toward the Z2 direction, which is the optical axis direction KD, is generated at the first coil 13 following Fleming's left hand rule. Accordingly, the lens holding member 2 moves in the Z2 direction. On the other hand, applying electric current from the other terminal T9 side to the first coil 13 generates electromagnetic force heading from the Z2 direction toward the Z1 direction, which is the optical axis direction KD, and the lens holding member 2 moves in the Z1 direction. Thus, applying electric current to the first coil 13 enables the lens driving device 100 to move the unshown lens member integrally with the lens holding member 2, supported by the biasing member 4 of the movable unit KU, in the optical axis direction KD (the Z direction in FIG. 2), by the electromagnetic force generated at the first coil 13.

In the second driving mechanism D2 of the lens driving device 100, the four second coils 23 are each electrically connected to power supplying terminals T9 via the multi-layer board 98 and the electroconductive portions 7c of the base member 7, so electric current can be applied from the terminals T9 to the second coils 23. On the other hand, magnetic fluxes from the permanent magnets EM leave the permanent magnets EM, pass through the second coils 23, and return to the permanent magnets EM.

Applying electric current to the pair of second coils 23 long in the X direction from this initial state generates electromagnetic force in the Y direction in the second coils 23 that are long in the X direction. Applying electric current to the pair of second coils 23 long in the Y direction generates electromagnetic force in the X direction in the second coils 23 that are long in the Y direction. The movable unit KU supported by the suspension wires 5 can be provided with thrust in the X direction or Y direction by the electromagnetic force generated at the second coils 23. Accordingly, the movable unit KU can be moved in the direction intersecting the optical axis direction KD (intersecting direction CD).

The advantages of the lens driving device 100 according to the first embodiment of the present invention, described above, will be summarized below. The lens driving device 100 according to the first embodiment of the present invention has the second portions 24 of the upper leaf spring 4A fixed on the upper spring fixing members B16, the wire fixing portion 64 soldered to the upper ends of the suspension wires 5 at a position outwards from the second portions 24, and linking portions 74 provided connecting between the second portions 24 and wire fixing portions 64. The linking portions 74 each have two extending portions 74e extending from two separated locations on the second portions 24 toward the wire fixing portions 64 side. The plate-shaped protruding portions 84 capable of being irradiated by laser beams are provided between the two extending portions 74e, protruding from the wire fixing portions 64 toward the inner side. Accordingly, the wire fixing portions 64 of the upper leaf spring 4A and the upper ends of the suspension wires 5 can be soldered by irradiating the protruding portions 84 of the upper leaf spring 4A by laser beams and conveying heat from the protruding portions 84 to the wire fixing portions 64. Accordingly, workability and the like can be improved and defects in the soldering process can be reduced as compared to a case of manually soldering. Consequently, a lens driving device 100 with good productivity can be provided.

Openings 84k adjacent to the wire fixing portions 64 are formed in the protruding portions 84, so the molten solder HD is dammed up by the openings 84k, and can be kept from widely spreading to the protruding portion 84 side. Accordingly, variance in the amount of solder at the wire fixing portions 64 can be reduced, and soldering the wire fixing portions 64 and the upper end of the suspension wires 5 can be carried out in a sure manner. Further, no solder HD flows to the portion irradiated by laser beam (portion onward from the opening 84k), so scattering of solder HD due to the laser beam and scorching of nearby synthetic resin material due to irregular reflection of the laser beam can be prevented.

The openings 84k are penetrating slots (through holes) formed broadly in the orthogonal direction orthogonal to the direction of protrusion of the protruding portions 84, and the width dimension of the openings 84k in the orthogonal direction is set to be greater than the width dimension between an edge of the protruding portions 84 and an edge of the openings 84k, so the solder HD can be dammed up in a sure manner by the openings 84k. Accordingly, the solder HD can be suppressed from widely spreading to the protruding portion 84 side in a sure manner.

Also, the width of the portion between the penetrated portions 64k and the openings 84k may be narrower than the width of the protruding portions 84 at the portion situated further inward from the openings 84k, so the external shape (footprint) of a solder fillet formed centered on the suspension wire 5 is restricted by this narrow portion. Accordingly, the solder fillet can be prevented from spreading over a wide area, and variance in the amount of solder at the wire fixing portions 64 can be reduced.

Figure 18:
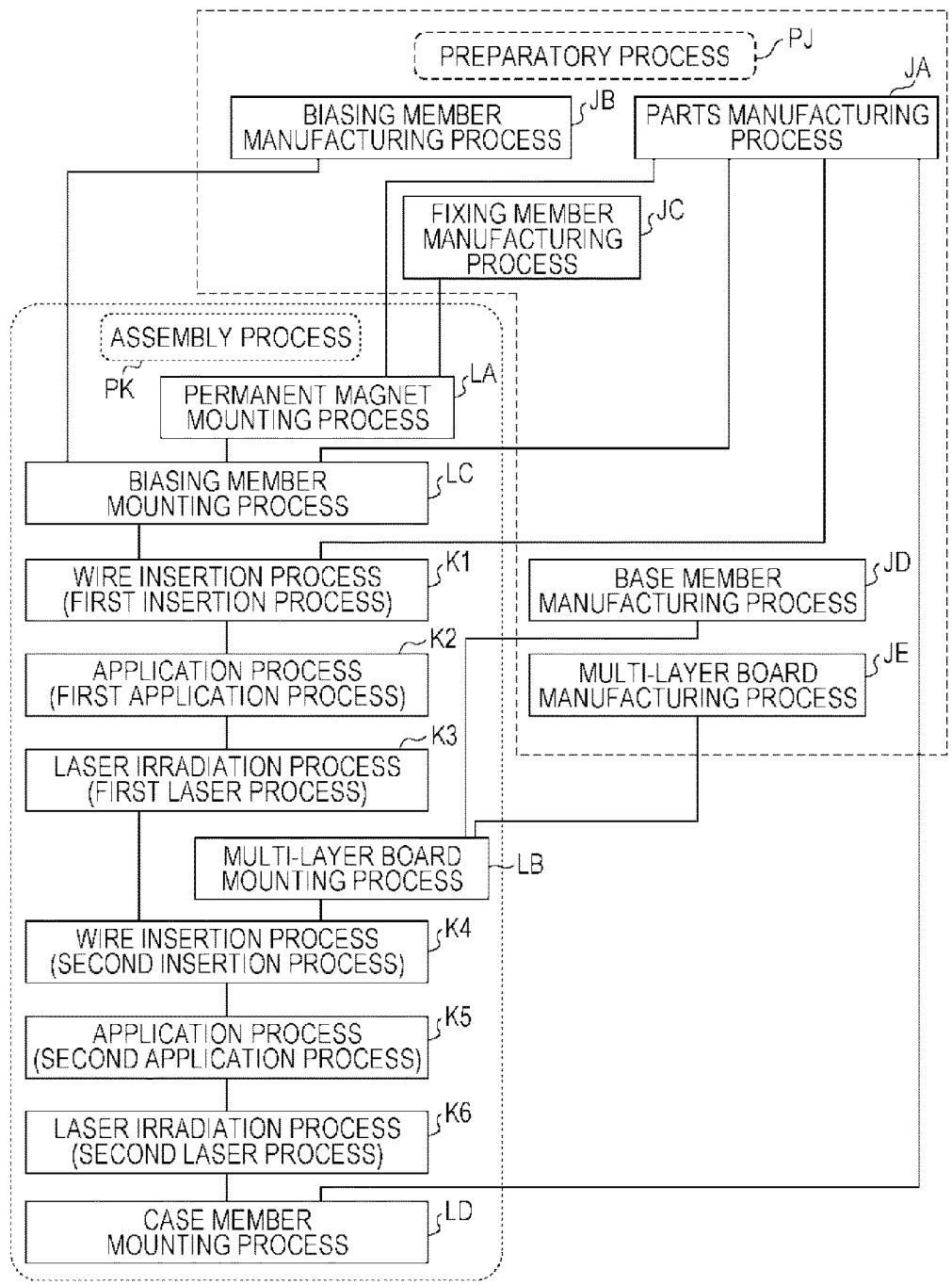
FIG. 18 is a diagram for describing a manufacturing method of the lens driving device according to the first embodiment of the present invention, illustrating each manufacturing process.

Next, a manufacturing method of the lens driving device 100 according to the first embodiment of the present invention will be described with reference to FIG. 18. FIG. 18 is a diagram for describing the manufacturing method of the lens driving device 100, and is an explanatory diagram illustrating the various manufacturing processes.

The manufacturing method of the lens driving device 100 according to the first embodiment of the present invention includes a preparatory process PJ of preparing the various members (the lens holding member 2, first coil 13, biasing member 4 (upper leaf spring 4A, lower leaf spring 4C), permanent magnets EM, suspension wires 5, fixing member R6, base member 7, multi-layer board 98 with the second coils 23 formed, magnetism detecting members 88, frame member W9, and case member H9, illustrated in FIG. 1), and an assembly process PK of assembling the members.

The preparatory process PJ includes a biasing member manufacturing process JB where the biasing member 4 that is soldered to the upper end of the suspension wires 5 is manufactured, a fixing member manufacturing process JC where the fixing member R6, to which the permanent magnets EM are fixed, is manufactured, a base member manufacturing process JD where the base member 7 that is soldered to the lower end of the suspension wires 5 is manufactured, and a multi-layer board manufacturing process JE where the multi-layer board 98 that is fixed to the base member 7 is manufactured, as illustrated in FIG. 18. Note that there is a manufacturing process JA for the other parts as well, but these have no outstanding features, so detailed description will be omitted here.

The assembly process PK has a wire insertion process where the suspension wires 5 are inserted through the penetrated portions 64k of the upper leaf spring 4A (first insertion process K1), an application process where solder paste is applied to the wire fixing portions 64 of the upper leaf spring 4A (first application process K2), a laser irradiation process where the wire fixing portions 64 and suspension wires 5 are soldered (first laser process K3), a wire insertion process where the suspension wires 5 are inserted through the through holes 7h of the base member 7 (second insertion process K4), an application process where solder paste is applied to the plated metal portions 7m of the base member 7 (second application process K5), and a laser irradiation process where the plated metal portions 7m and the suspension wires 5 are soldered (second laser process K6), as illustrated in FIG. 18. Note that there are other processes relating to assembly as well, but these have no outstanding features, so detailed description will be omitted here.

First, the preparatory process PJ will be described. In the manufacturing process JA in the preparatory process PJ, the cylindrically-formed lens holding member 2 is first formed by injection molding using LCP or the like. Metal wire that has been covered (coated) on the outside with an insulator is wound onto one winding post 12k of the lens holding member 2, and wound onto the peripheral face formed between the eaves portion 22 and flange portion 32. Once the winding is ended, the metal wire is wound onto the other winding post 12k and severed, thereby manufacturing the octagonal first coil 13.

Next, in the biasing member manufacturing process JB in the preparatory process PJ, a metal plate of copper alloy or the like is prepared, and the biasing member 4, i.e., upper leaf spring 4A and lower leaf spring 4C, is manufactured by multiple punching operations using multiple molds.

When manufacturing the upper leaf spring 4A, the shapes of the molds are decided so as to have the first portions 14 that are fixed to the lens holding member 2, the second portions 24 that are fixed to the upper spring fixing members B16, the elastic arm portions 54A provided between the first portions 14 and the second portions 24, the wire fixing portion 64 that are situated outwards from the second portions 24 and to which the upper end of the suspension wires 5 are soldered, and the linking portions 74 provided connecting between the second portions 24 and the wire fixing portions 64, as illustrated in FIG. 8A. The shapes of the molds are also decided so that the linking portions 74 each have two extending portions 74e extending from two separated locations on the second portions 24 toward the wire fixing portions 64 side, with the plate-shaped protruding portions 84 provided between the two extending portions 74e, protruding from the wire fixing portions 64 toward the inner side.

The shapes of the molds are also decided so that the wire fixing portions 64 having the penetrated portions 64k through which the suspension wires 5 can be passed, and the protruding portion 84 having the openings 84k adjacent to the wire fixing portion 64, are formed. Further, the shapes of the molds are also decided so that the openings 84k are formed of through holes (penetrating slots) having the dimension in the orthogonal direction orthogonal to the direction of protrusion of the protruding portions 84 formed greater than the dimension in the direction of protrusion, where the dimension of the openings 84k in the orthogonal direction is greater than the dimension between an edge of the protruding portions 84 and an edge of the openings 84k in the orthogonal direction, and the width of the portion between the penetrated portions 64k and the openings 84k is narrower than the protruding portions 84 of the portion located further inward from the openings 84k.

When manufacturing the lower leaf spring 4C, the shapes of the molds are also decided in the same way so as to have the third portions 34 that are fixed to the lens holding member 2, the fourth portions 44 that are fixed to the lower spring fixing members B26, the elastic arm portions 54C provided between the third portions 34 and the fourth portions 44, and linking portions R4 connecting between the third portions 34, as illustrated in FIG. 8B. Note that the upper leaf spring 4A and lower leaf spring 4C may be formed by etching instead of punching.

Next, in the manufacturing process JA in the preparatory process PJ, a magnetic material such as neodymium or the like is sintered into slender bars, thereby manufacturing the permanent magnets EM. Four permanent magnets EM of the same share are prepared, and magnetized so that the inner faces EMp and the outer faces EMq of the permanent magnets EM have different magnetic polarity.

Next, in the manufacturing process JA in the preparatory process PJ, metal line of copper alloy or the like is prepared, and this metal line is cut into desired lengths, thereby manufacturing the suspension wires 5 that have electroconductivity and excellent elasticity.

Next, in the fixing member manufacturing process JC of the preparatory process PJ, the fixing member R6 that has a generally rectangular frame shape in plan view is formed by injection molding using LCP or the like. The desired shape can be obtained when manufacturing the fixing member R6 by deciding the shape of the mold beforehand.

Specifically, the shape of the mold is decided so as to have the facing wall portions 46 forming the perimeter, the frame portion 56 forming the upper face, the extending portions 66 formed at the four corners and protruding downwards from the frame portion 56, and the positioning portions 76 capable of facing the inner faces EMp of the permanent magnets EM facing toward the first coil 13 side. In the same way, the facing wall portions 46 are formed having the notch at the middle portion, with the length dimension of the facing wall portion 46 in the optical axis direction KD being formed smaller than the length dimension of the positioning portions 76.

The shape of the mold is also decided so as to have the first space 6g between the facing wall portions 46 and the outer faces EMq of the permanent magnets EM (see FIG. 13) in a case where the permanent magnets EM are accommodated in the fixing member R6, and the second space between the frame portion 56 and the upper faces EMa of the permanent magnets EM in a case where the lower faces EMz of the permanent magnets EM and the lower faces 66p of the extending portions 66 are flush.

The shape of the mold is also decided so that the upper spring fixing members B16 where the other side (second portions 24) of the upper leaf spring 4A is fixed are formed on the upper face of the frame portion 56 of the fixing member R6, and the lower spring fixing members B26 where the other side (fourth portions 44) of the lower leaf spring 4C is fixed are formed on the lower side of the extending portions 66 of the fixing member R6.

Next, in the base member manufacturing process JD in the preparatory process PJ, a first molded member that supports the electroconductive portions 7c and terminals T9 is first formed by injection molding using LCP or the like. Next, catalytic treatment of the first molded member is performed, for plating. Next, the first molded member is set in a mold, and a second molded member is formed by injection molded so as to cover everything except for portions corresponding to the electroconductive portions 7c and terminals T9. Accordingly, a plate-shaped molded member that has a rectangular outer shape and a ring shape with a circular opening at the middle portion thereof, having the frame-shaped base portion 17, adhesive agent distribution portion 37 provided on the upper face side of the base member 7, and thin portions 57 situated at the corners of the base member 7, is manufactured. Finally, a plating film is formed on the portions where the first molded member is exposed at the surface, in the order of copper plating, nickel plating, and gold plating. Thus, the base member 7, where the electroconductive portions 7c and terminals T9 are three-dimensionally laid on the upper face, lower face 17u, and side faces, is manufactured.

When manufacturing the base member 7, a desired shape can be obtained by deciding the shape of the mold beforehand, in the same way as with the fixing member R6. Specifically, the mold is manufactured so that the thin portions 57 have the through holes 7h through which the suspension wires 5 are inserted, and the plated metal portions 7m of metal film formed around the through holes 7h and on the inner faces of the through holes 7h, and such that the lower faces 57v of the thin portions 57 are situated higher than the lower face 17u of the base portion 17.

Also, when manufacturing the base member 7, the thin portions 57 and the base portion 17 are formed connected by wall portions 57w at least partially in a stepped manner, and the first molded member and the second molded member are formed such that the lower faces 57v and wall portions 57w of the thin portions 57 are plated with the same metal film as the plated metal portion 7m.

Next, in the multi-layer board manufacturing process JE in the preparatory process PJ, a panel where multiple electroconductive layers are formed is used. Multiple multi-layer boards 98 are formed on the panel, and then divided, thereby manufacturing the multi-layer board 98. At this time, the multi-layer board 98 is configured of two boards that face each other across the middle of the lens holding member 2, so two multi-layer boards 98 can be laid out with better yield as compared to a case of a being configured by a single connected board. Accordingly, the manufacturing cost of the multi-layer board 98 can be reduced.

Second coils 23, where multiple layers of spiral coil patterns are formed, are manufactured on this multi-layer board 98. The second coils 23 are provided such that each of the pairs across the lens holding member 2 are of the same size and in point symmetry in plan view from the optical axis direction KD, when assembling the two multi-layer boards 98. Accordingly, when current is applied to the second coils 23, no force is generated that would rotate the movable unit KU, and the movable unit KU can be driven in directions intersecting the otpical axis (intersecting direction CD) in a well-balanced and appropriate manner.

Next, in the manufacturing process JA in the preparatory process PJ, magnetism detecting members 88, where magnetism detecting elements (GMR elements) are packaged by thermosetting synthetic resin, are manufactured. At this time, a resin packaging base material having a pattern where four terminal portions are externally exposed is used, the magnetism detecting elements (GMR elements) are placed in the resin packaging base material, connected to other wiring by wire bonding, and thereafter packaged.

The two magnetism detecting members 88 are installed to the lower face of the multi-layer board 98 using a mounter or the like. At this time, the magnetism detecting members 88 are provided on exponential lines of the longitudinal directions of the two adjacent second coils 23, so the magnetism detecting elements are not readily affected by the magnetic fields generated by the second coils 23. Further, two magnetism detecting elements are mounted together below one divided multi-layer board 98, so that the magnetism detecting members 88 (magnetism detecting elements) are mounted to just minimally necessary boards, thereby improving productivity.

Also, in the manufacturing process JA in the preparatory process PJ, the frame member W9 that is generally rectangular in shape and has a rectangular opening in the middle is formed by injection molding using PBT or the like. A pair of penetrating holes W9k, through which protrusions B16t of the upper spring fixing members B16 are inserted, are provided at each of the corners of the frame member W9.

In the manufacturing process JA in the preparatory process PJ, the case member H9 is fabricated by cutting, raising, or the like, of a metal plate of a non-magnetic metal material. The external shape is that of a box having a generally rectangular shape in plan view.

Next, the assembly process PK will be described. First, the permanent magnet mounting process LA, where the permanent magnets EM are mounted to the fixing member R6, is performed beforehand, as illustrated in FIG. 18. When assembling the permanent magnets EM to the fixing member R6, the permanent magnets EM are placed on a flat plate jig, and the fixing member R6 is further placed thereupon so as to cover the permanent magnets EM. Accordingly, the lower faces EMz of the permanent magnets EM and the lower faces 66p of the extending portions 66 of the fixing member R6 can be easily made to be aligned on the same plane. This enables the permanent magnets EM to be precisely disposed. Thermosetting adhesive agent is applied beforehand to the portion of the second gaps created between the upper faces EMa of the permanent magnets EM and the frame portion 56 of the fixing member R6.

After the permanent magnets EM are assembled to the fixing member R6, an ultraviolet curable adhesive agent is applied to the notches 46k (recesses) of the facing wall portions 46. Having the notches 46k allows the adhesive agent to be easily applied. Further, the fixing member R6 and the permanent magnets EM can be fixed by adhesion at a wide area between the facing wall portions 46 and the outer faces of the permanent magnets EM, so the permanent magnets EM can be fixed strongly to the fixing member R6.

After the ultraviolet curable adhesive agent is applied, a thin jig is inserted between the permanent magnets EM and the facing wall portions 46, bringing the inner faces EMp of the permanent magnets EM into contact with the positioning portions 76. The adhesive agent is irradiated by ultraviolet light in this state, thereby hardening the ultraviolet curable adhesive agent, and fixing the permanent magnets EM to the fixing member R6. The jig is thereafter removed.

A thermosetting adhesive agent is further applied to the portion of the third gaps 6s provided between the extending walls 66w of the fixing member R6 and the inner faces EMp of the permanent magnets EM, and heated, thereby hardening the thermosetting adhesive agent. The permanent magnets EM can thus be powerfully fixed to the fixing member R6 at the second gap portions and third gap 6s portions. Accordingly, the permanent magnets EM can be prevented from coming loose from the fixing member R6 in a sure manner even if subjected to strong shock, such as being dropped or the like.

Thus, even if there is variance in the thickness of the permanent magnets EM, the inner faces EMp of the permanent magnets EM and the positioning portions 76 of the fixing member R6 are in contact and positioned, so variance in distance between the inner faces EMp of the permanent magnets EM and the first coil 13 is suppressed when assembling the permanent magnets EM (fixing member R6), and the permanent magnets EM are disposed in a precise manner. Accordingly, the magnetic force of the permanent magnets EM acting on the first coil 13 is stabilized, and thrust for moving the lens holding member 2 in the optical axis direction KD is also stabilized.

Next, a multi-layer board mounting process LB, where the multi-layer board 98 is mounted on the base member 7, is performed beforehand, as illustrated in FIG. 18. When fixing the multi-layer board 98 to the base member 7, a thermosetting adhesive agent is first applied to the protruding portions on the inner side of the annular grooves 37*m* of the base member 7. Next, the multi-layer board 98 is placed upon the base member 7. At this time, overflowing adhesive agent is accommodated in the spaces of the annular grooves 37*m*. Finally, the adhesive agent is hardened by heating, thereby fixing the multi-layer board 98 to the base member 7.

Next, a biasing member mounting process LC is performed. First, the first portions 14 of the upper leaf spring 4A are fixed to the lens holding member 2. At this time, protrusions 12*t* of the lens holding member 2 are inserted into through holes of the first portions 14, and these protrusions 12*t* are fused, thereby fixing one side of the upper leaf spring 4A to the lens holding member 2.

Next, the fixing member R6 manufactured in the permanent magnet mounting process LA (the permanent magnets EM are mounted therein) and the frame member W9 are assembled with the upper leaf spring 4A interposed therebetween, and the second portions 24 of the upper leaf spring 4A are fixed to the upper spring fixing members B16 (fixing member R6). At this time, the protrusions B16*t* of the upper spring fixing members B16 are inserted through the through holes of the second portion 24 and the holes W9*k* penetrating the frame member W9, and these portions are fixed by adhesive agent, thereby fixing the other side of the upper leaf spring 4A to the fixing member R6 side.

Next, the lower leaf spring 4C is assembled in. At this time, the third portions 34 of the lower leaf spring 4C and the recesses 32*r* of the lens holding member 2 are fixed by adhesive agent, and the fourth portions 44 of the lower leaf spring 4C and the lower spring fixing members B26 (fixing member R6) are fixed by adhesive agent.

Next, the wire insertion process (first insertion process K1) is performed, as illustrated in FIG. 18. In the wire insertion process (first insertion process K1), the suspension wires 5 are inserted through the penetrated portions 64*k* of the upper leaf spring 4A. Accordingly, the wire fixing portions 64 and the suspension wires 5 can be easily engaged. After insertion of the suspension wires 5, an intermediate portion of the suspension wires 5 is clamped with a jig, so that there is no positional deviation of the suspension wires 5.

Next, after the wire insertion process (first insertion process K1), the application process (first application process K2) is performed, as illustrated in FIG. 18. In the application process (first application process K2), solder paste is applied on the upper face of the wire fixing portions 64 including the penetrated portions 64*k* of the upper leaf spring 4A using a dispenser device. Accordingly, solder paste can be applied to the entire circumference of the suspension wires 5, and soldering can be performed to the entire circumference of the suspension wires 5 in the following laser irradiation process (first laser process K3).

This application process (first application process K2) is performed after the wire insertion process (first insertion process K1), so the suspension wires 5 can be inserted through the penetrated portions 64*k* in a state where no solder paste has been applied to the penetrated portions 64*k*. This can prevent deformation of the suspension wires 5 due to the presence of solder paste (passing through suspension wires 5 through the penetrated portions 64*k* in a state where solder paste is applied may deform the suspension wires 5).

Next, after the application process (first application process K2), the laser irradiation process (first laser process K3) is performed, as illustrated in FIG. 18. In the laser irradiation process (first laser process K3), the protruding portions 84 connected to the wire fixing portions 64 are irradiated by a laser beam. Accordingly, the protruding portions 84 on the upper leaf spring 4A are heated by the laser beam, heat is conducted from the protruding portions 84 to the wire fixing portions 64 connected to the protruding portion 84, thereby heating the wire fixing portions 64. Accordingly, the solder paste applied to the wire fixing portions 64 is heated and becomes molten solder HD. Thereafter, the solder HD cools, and thus the upper end of the suspension wires 5 and the wire fixing portions 64 of the upper leaf spring 4A are soldered (soldering process). Accordingly, workability and the like can be improved and defects in the soldering process can be reduced as compared to a case of manually soldering.

In the first embodiment according to the present invention, the openings 84*k* are formed in the protruding portions 84 adjacent to the wire fixing portions 64, so the molten solder HD is dammed up by the openings 84*k*, and can be kept from widely spreading to the protruding portion 84 side in the laser irradiation process (first laser process K3). Accordingly, variance in the amount of solder at the wire fixing portions 64 can be reduced, and soldering the wire fixing portions 64 and the upper end of the suspension wires 5 can be carried out in a sure manner. Further, no solder HD flows to the portion irradiated by laser beam (portion inward from the opening 84*k*), so scattering of solder HD due to the laser beam and scorching of nearby synthetic resin material due to irregular reflection of the laser beam can be prevented.

Further, in the first embodiment according to the present invention, the openings 84*k* are penetrating slots (through holes) formed broadly in the orthogonal direction orthogonal to the direction of protrusion of the protruding portions 84, and the width dimension of the openings 84*k* in the orthogonal direction is set to be greater than the width dimension between an edge of the protruding portions 84 and an edge of the openings 84*k*, so the solder HD can be dammed up in a sure manner by the openings 84*k*. Accordingly, the solder HD can be suppressed from widely spreading to the protruding portion 84 side in a sure manner.

Also, in the first embodiment according to the present invention, the width of the portion between the penetrated portions 64*k* and the openings 84*k* may be narrower than the width of the protruding portions 84 at the portion situated further inward from the openings 84*k*, so the external shape (footprint) of a solder fillet formed centered on the suspension wires 5 is restricted by this narrow portion. Accordingly, the solder fillet can be prevented from spreading over a wide area, and variance in the amount of solder at the wire fixing portions 64 can be reduced. The jig is removed from the suspension wires 5 after the soldering process.

Next, the article is turned upside down with the upper leaf spring 4A on the bottom, and the wire insertion process (second insertion process K4) is performed, as illustrated in FIG. 18. In the wire insertion process (second insertion process K4), the base member 7 (with multi-layer board 98 mounted) manufactured in the multi-layer board mounting process LB is assembled from above, and the suspension wires 5 are inserted through the through holes 7*h* of the base member 7. Accordingly, the base member 7 and suspension wires 5 can be easily engaged. Although description is made that the article is turned upside down with the upper leaf spring 4A on the bottom, in order to facilitate manufacturing in the subsequent application process (second application process K5) and laser irradiation process (second laser process K6), the article does not necessarily have to be turned upside down.

Next, after the wire insertion process (second insertion process K4), the application process (second application process K5) is performed, as illustrated in FIG. 18. In the application process (second application process K5), a dispenser device is used to apply solder paste to the through holes 7h of the base member 7 and the plated metal portions 7m situated around the through hole 7h, from the lower face 57v side of the thin portions 57. Accordingly, solder paste can be applied to the entire circumference of the suspension wires 5, and soldering can be performed to the entire circumference of the suspension wires 5 in the subsequent laser irradiation process (second laser process K6).

This application process (second application process K5) is performed after the wire insertion process (second insertion process K4), so the suspension wires 5 can be inserted through the through holes 7h in a state where no solder paste has been applied to the through holes 7h. This can prevent deformation of the suspension wires 5 due to the presence of solder paste (passing through suspension wires 5 through the through hole 7h in a state where solder paste is applied may deform the suspension wires 5).

Also, in the base member manufacturing process JD, the through holes 7h have been provided on the thin portions 57 formed smaller in the thickness dimension than the base portion 17, so the surface area of the plated metal portions 7m formed on the inner faces of the through holes 7h can be reduced. Accordingly, the amount of solder paste loaded to the inner faces of the through holes 7h can be reduced.

Next, after the application process (second application process K5), the laser irradiation process (second laser process K6) is performed, as illustrated in FIG. 18. In the laser irradiation process (second laser process K6), the solder paste is directly irradiated by a laser beam. Accordingly, the solder paste is directly heated and becomes molten solder HD. The solder HD then cools, thus soldering the lower end of the suspension wires 5 and the plated metal portions 7m formed around the through holes 7h and on the inner faces of the through holes 7h. Accordingly, the suspension wires 5 are fixed to the base member 7 that is plate-shaped and has rigidity. This enables the suspension wires 5 to be supported in a more stable manner as compared to the film FPC board 933 according to the conventional example, and control in the intersecting direction CD intersecting the optical axis direction KD for image stabilization can be performed in a stable manner. Spot heating by laser beam is used, which has good productivity. In the laser irradiation process (second laser process K6), the solder paste is directly irradiated by a laser beam, so the laser output is smaller than the laser output in the laser irradiation process (first laser process K3).

Also, in the first embodiment of the present invention, irradiation by laser beam is performed from the lower face (lower) side of the base member 7 (from the side opposite to the side where the movable unit KU is disposed) in the laser irradiation process (second laser process K6). Accordingly, when soldering the lower end of the suspension wire 5, even if flux or solder HD does scatter and strike the lower faces 57v and wall portions 57w when irradiating by a laser beam for example, the synthetic resin material making up the base member 7 of the lower faces 57v and wall portions 57w can be prevented from scorching, since the same metal film as that of the plated metal portions 7m is formed at the lower faces 57v and wall portions 57w. Further, even if the laser beam that has struck the solder paste scatters irregularly and partially strikes the wall portions 57w when irradiating by a laser beam, the synthetic resin material making up the base member 7 of the wall portions 57w can be prevented from scorching.

Also, heat can be dissipated from the lower faces 57v and wall portions 57w by the metal film formed thereat. Further, the metal film is continuous from the wall portions 57w to the terminal portion formed at the base portion 17 (electroconductive portions 7c), so excess heat can be dissipated by the metal film and terminals at these portions. Accordingly, the amount of heat applied to the thin portions 57 can be reduced, further suppressing damage to the base member 7.

Also, in the first embodiment of the present invention, the amount of solder paste loaded to the inner faces of the through holes 7h is reduced in the application process (second application process K5), so the amount of heat to be applied to the solder paste in the laser irradiation process (second laser process K6) can be reduced, so damage to the base member 7 can be suppressed.

Also, in the first embodiment of the present invention, the outmost layer of the metal film is formed of gold, which is well-suited to soldering in the laser irradiation process (second laser process K6). The reflectance of the laser beam by gold is high (approximately 95%), so even in a case where the laser beam that has struck the solder paste or the solder HD irregularly scatters and partially strikes the lower faces 57v or wall portions 57w of the thin portions 57, the laser can be reflected in a sure manner. This enables the amount of heat applied to the thin portions 57 and wall portion 57w to be reduced even more, even further suppressing damage to the base member 7.

Finally, a case member mounting process LD is performed, as illustrated in FIG. 18. In the case member mounting process LD, adhesive agent is applied on the inner side of the case member H9, and the case member H9 is mounted to the base member 7 so as to accommodate the movable unit KU, suspension wires 5, and so forth. Hardening of the adhesive agent fixes the case member H9 and base member 7 together.

Advantages of the manufacturing method of the lens driving device 100 according to the first embodiment of the present invention described above will be summarized below. The manufacturing method of the lens driving device 100 according to the first embodiment of the present invention includes an application process of applying solder paste to the wire fixing portions 64 of the upper leaf spring 4A, and a laser irradiation process of irradiating the protruding portions 84 connected to the wire fixing portions 64 by a laser beam. Accordingly, the protruding portions 84 of the upper leaf spring 4A are heated by the laser beam, and the wire fixing portions 64 connected to the protruding portions 84 are heated. The solder paste applied to the wire fixing portions 64 is thus heated and becomes molten solder HD. Thereafter, the solder HD cools, and thus the upper end of the suspension wires 5 and the wire fixing portions 64 of the upper leaf spring 4A are soldered. Accordingly, workability and the like can be improved and defects in the soldering process can be reduced as compared to a case of manually soldering.

The penetrated portions 64k through which the suspension wires 5 are inserted are provided to the wire fixing portions 64, so the wire fixing portions 64 and the suspension wires 5 can be easily engaged, and soldering can be performed to the entire circumference of the suspension wires 5. The wire insertion process is performed before the application process, so the suspension wires 5 can be inserted through the penetrated portions 64k in a state where no solder paste has been applied to the penetrated portions 64k. This can prevent deformation of the suspension wires 5 due to the presence of solder paste (passing through suspension wires 5 through the penetrated portions 64k in a state where solder paste is applied may deform the suspension wires 5).

The openings 84k are formed in the protruding portions 84 adjacent to the wire fixing portions 64, so the molten solder HD is dammed up by the openings 84k, and can be kept from widely spreading to the protruding portion 84 side in the laser irradiation process (first laser process K3). Accordingly, variance in the amount of solder at the wire fixing portions 64 can be reduced, and soldering the wire fixing portions 64 and the upper end of the suspension wires 5 can be carried out in a sure manner. Further, no solder HD flows to the portion irradiated by laser beam (portion inward from the opening 84k), so scattering of solder HD due to the laser beam and scorching of nearby synthetic resin material due to irregular reflection of the laser beam can be prevented.

Also, the openings 84k are formed as penetrating slots (through holes) formed broadly in the orthogonal direction orthogonal to the direction of protrusion of the protruding portions 84, and the width dimension of the openings 84k in the orthogonal direction is set to be greater than the width dimension between an edge of the protruding portions 84 and an edge of the openings 84k, so the solder HD can be dammed up in a sure manner by the openings 84k. Accordingly, the solder HD can be suppressed from widely spreading to the protruding portion 84 side.

Also, the width of the portion between the penetrated portions 64k and the openings 84k may be narrower than the width of the protruding portions 84 at the portion situated further inward from the openings 84k, so the external shape (footprint) of a solder fillet formed centered on the suspension wires 5 is restricted by this narrow portion. Accordingly, the solder fillets can be prevented from spreading over a wide area, and variance in the amount of solder at the wire fixing portions 64 can be reduced.

The present invention is not restricted to the above-described embodiment, and can be modified and carried out as described below, for example. Such embodiments also belong to the technical scope of the present invention.

Figure 19A:
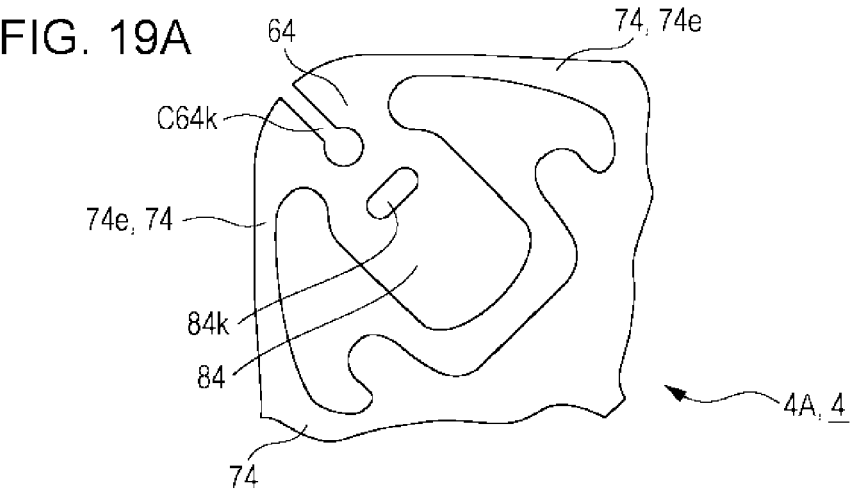
FIGS. 19A through 19C are diagrams for describing a modification of the lens driving device according to the first embodiment of the present invention, FIG. 19A being an enlarged top view illustrating a third modification of the upper leaf spring, FIG. 19B being an enlarged top view illustrating a fourth modification of the upper leaf spring, and FIG. 19C being an enlarged lower perspective view illustrating sixth through eighth modifications of the base member.
Figure 19B:
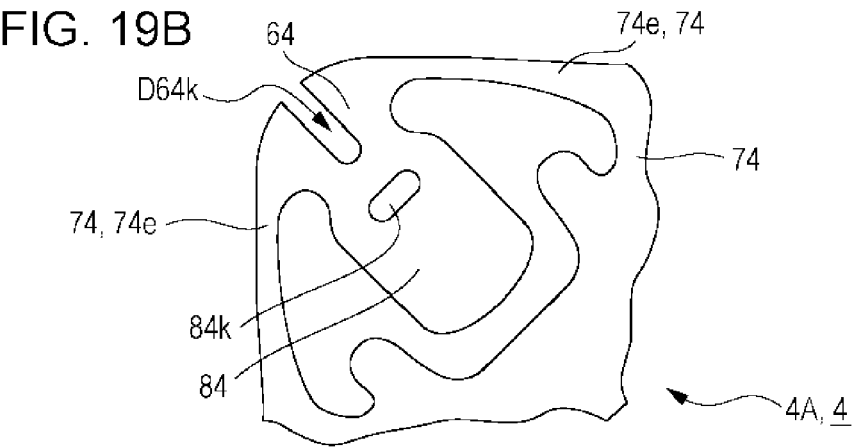
Figure 19C:
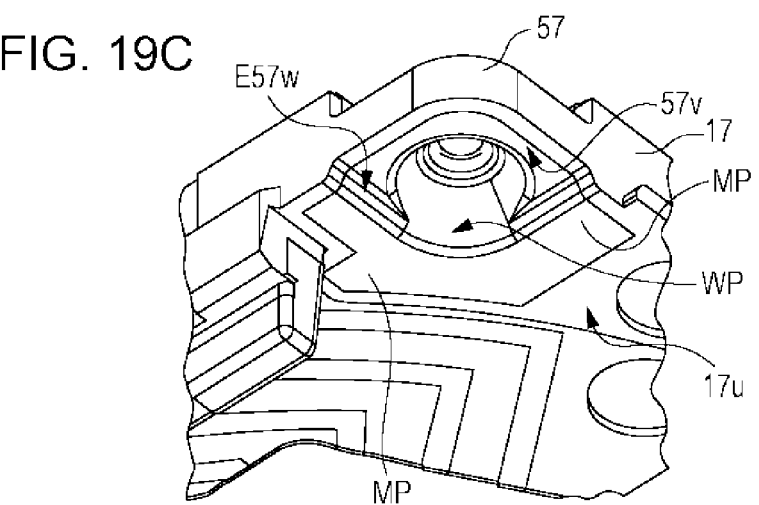
Figure 21A:
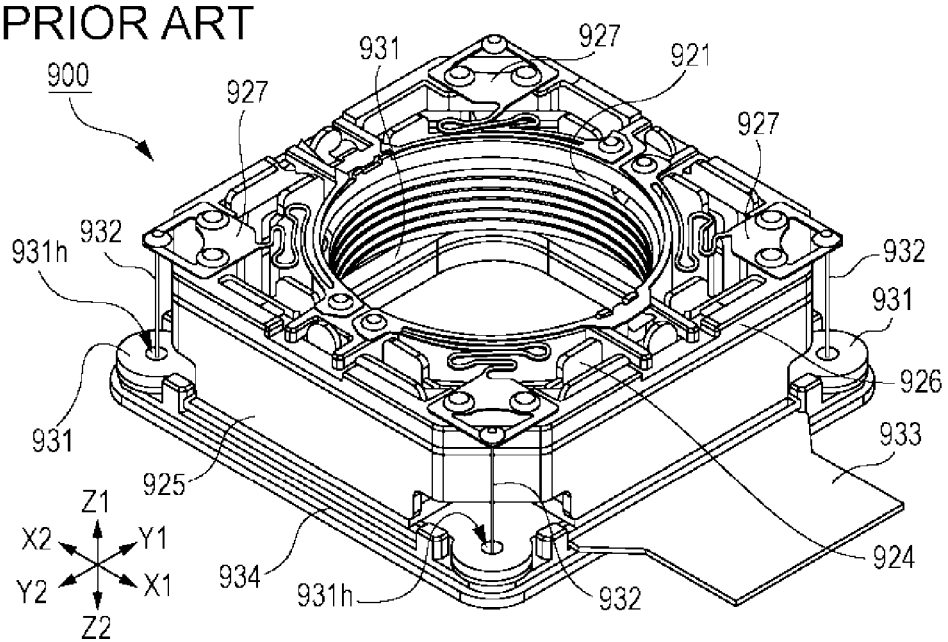
FIGS. 21A and 21B are diagrams for describing the lens driving device according to the conventional example, FIG. 21A being an upper perspective view of the lens driving device, and FIG. 21B being a lower perspective view of the lens driving device.
Figure 21B:
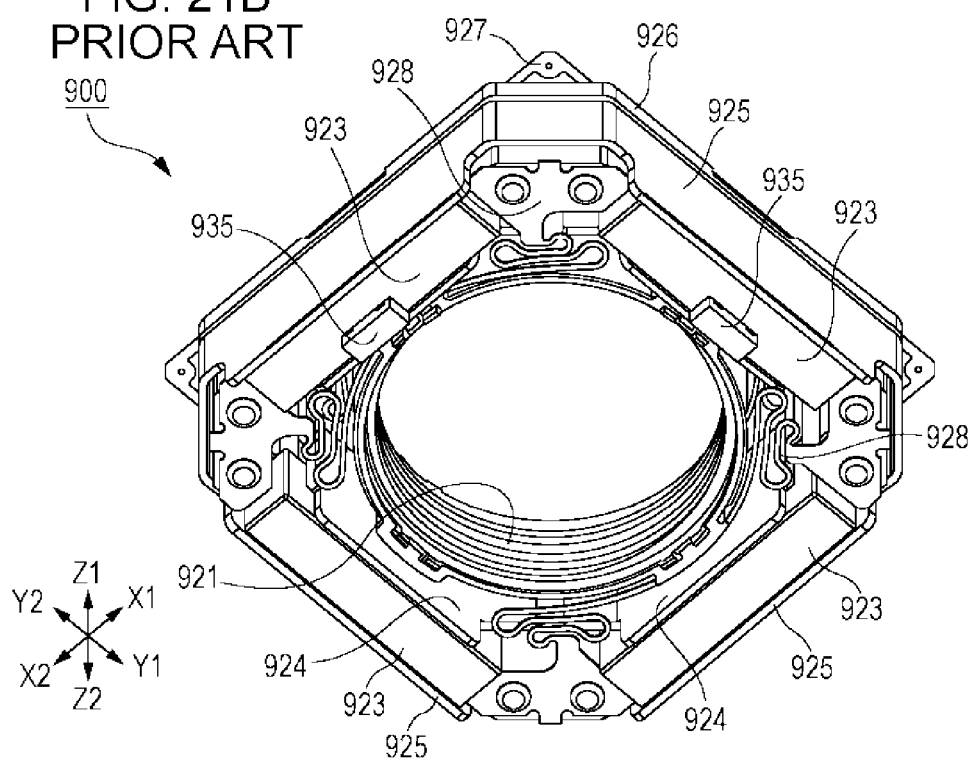

FIGS. 19A through 19C are diagrams for describing a modification of the lens driving device 100. FIG. 19A is an enlarged top view illustrating a third modification of the upper leaf spring 4A, FIG. 19B is an enlarged top view illustrating a fourth modification of the upper leaf spring 4A, and FIG. 19C is an enlarged lower perspective view illustrating sixth through eighth modifications of the base member 7.

First Modification

A configuration has been described in the above first embodiment where the upper spring fixing members B16 and lower spring fixing members B26, to which the other side of the biasing member 4 (upper leaf spring 4A and lower leaf spring 4C) is fixed, are provided integrally with the fixing member R6. However, this is not restrictive, and members that are each separate may be used.

Second Modification

A configuration has been described in the above first embodiment where the openings 84k preferably are formed as penetrating holes. However, this is not restrictive, and an opening may be formed as a stepped recess (depression).

Third and Fourth Modifications

A configuration has been described in the above first embodiment where the penetrated portion 64k through which the suspension wire 5 is passed is formed as a penetrating hole, as illustrated in FIG. 10A. However, this is not restrictive. For example, a penetrated portion C64k that has a notched shape having been partially notched, as illustrated in FIG. 19A, may be used (third embodiment), or a penetrated portion D64k that is a U-shaped notch, as illustrated in FIG. 19B, may be used (fourth embodiment).

Fifth Modification

A configuration has been described in the above first embodiment where the base member 7 is preferably used as a supporting member supporting the lower end of the suspension wires 5. However, this is not restrictive. For example, the lower end of the suspension wires 5 may be fixed to the multi-layer board 98, using the multi-layer board 98 as the supporting member.

Sixth and Seventh Modifications

A configuration has been described in the above first embodiment where the lower face 57v of the thin portion 57 and the lower face 17u of the base portion 17 are connected by a wall portion 57w having a perpendicular wall, as illustrated in FIG. 15B. However, this is not restrictive, and a configuration may be made where the thin portion 57 and the base portion 17 are connected having a step at least partially. For example, a wall portion E57w may have an inclined wall formed inclined as to the lower face 57v of the thin portion 57 as illustrated in FIG. 19C (sixth modification), or a configuration may be made where the thin portion 57 and the base portion 17 are not connected having a step from the lower face 57v of the thin portion 57, but rather directly connected (WP in FIG. 19C).

Eighth Modification

A configuration has been described in the above first embodiment where a metal film the same as that of the plated metal portion 7m is formed at the lower face 57v of the thin portion 57 and the perpendicular wall portion of the wall portion 57w, as illustrated in FIG. 15B. However, this is not restrictive, and a configuration may be made where a metal film (MP in FIG. 19C) is formed from the wall portion E57w to the lower face 17u of the base portion 17 as illustrated in FIG. 19C. Accordingly, excessive heat can be further dissipated by the metal film at this portion, and thereby further reduce the amount of heat applied to the thin portion 57.

Ninth Embodiment

A configuration has been described in the above first embodiment where a GMR element is preferably used as the magnetism detecting members 88, but other elements where the electric resistance changes in accordance with change in a magnetic field may be used, such as magnetoresistance (MR) elements, anisotropic magnetoresistance (AMR) elements, tunnel magnetoresistance (TMR) elements, or the like. Further, the magnetism detecting members 88 are not restricted to elements where the electric resistance changes in accordance with change in a magnetic field, and a Hall effect sensor may be used, for example.

The present invention is not restricted to the above embodiments, and various modification may be made without departing from the essence of the present invention.

What is claimed is:

1. A lens driving device, comprising:
a movable unit including:
a lens holding member configured to hold a lens member, and
a first driving mechanism configured to move the lens holding member in an optical axis direction;
a suspension wire configured to support the movable unit movably in a direction intersecting the optical axis direction;
a supporting member configured to support a lower end of the suspension wire; and
a second driving mechanism configured to move the movable unit in a direction intersecting the optical axis direction,
wherein the movable unit further includes:
an upper leaf spring and a lower leaf spring configured to support the lens holding member movably in the optical axis direction and
a fixing member disposed at an outer side of the lens holding member and configured to fix the upper leaf spring,
wherein the upper leaf spring includes
a first portion fixed to the lens holding member,
a second portion fixed to the fixing member,
an elastic arm portion disposed between the first portion and the second portion,
a wire fixing portion disposed at an outer side of the second portion and soldered to an upper end of the suspension wire, and
a linking portion configured to connect between the second portion and the wire fixing portion,
wherein the linking portion has two extending portions extending from two separate positions on the second portion toward the wire fixing portion side,
and wherein a plate-shaped protruding portion protruding inwards from the wire fixing portion is provided between the two extending portions.

2. The lens driving device according to claim 1, wherein the wire fixing portion has a penetrated portion through which the suspension wire is passed.

3. The lens driving device according to claim 2, wherein the protruding portion has an openeing at a position adjacent to the wire fixing portion.

4. The lens driving device according to claim 3, wherein a dimension from the opening to a tip of the protruding portion in the direction of protrusion is greater than a dimension between the penetrated portion and the opening.

5. The lens driving device according to claim 3, wherein the opening is a through hole, where a dimension in an orthogonal direction orthogonal to the direction of protrusion of the protruding portion is greater than a dimension in the direction of protrusion,
and wherein a width dimension of the opening in the orthogonal direction is set to be greater than a width dimension between an edge of the protruding portion and an edge of the opening in the orthogonal direction.

6. The lens driving device according to claim 3, wherein the upper leaf spring has a portion between the penetrated portion and the opening, a width thereof being narrower than a width of the protruding portion at a position inward from the opening.

7. A manufacturing method of a lens driving device including
a movable unit including:
a lens holding member configured to hold a lens member, and
a first driving mechanism configured to move the lens holding member in an optical axis direction,
a suspension wire configured to support the movable unit movably in a direction intersecting the optical axis direction,
a supporting member configured to support a lower end of the suspension wire, and
a second driving mechanism configured to move the movable unit in a direction intersecting the optical axis direction,
the movable unit further including
an upper leaf spring and a lower leaf spring configured to support the lens holding member movably in the optical axis direction and
a fixing member disposed at an outer side of the lens holding member and configured to fix the upper leaf spring,
the upper leaf spring including:
a first portion to be fixed to the lens holding member,
a second portion to be fixed to the fixing member,
an elastic arm portion disposed between the first portion and the second portion,
a wire fixing portion disposed at an outer side of the second portion and to be soldered to an upper end of the suspension wire, and
a linking portion configured to connect between the second portion and the wire fixing portion,
the linking portion having two extending portions extending from two separate positions on the second portion toward the wire fixing portion side,
and a plate-shaped protruding portion protruding inwards from the wire fixing portion being provided between the two extending portions,
the method comprising:
an application process of applying solder paste on the wire fixing portion; and
a laser irradiation process of soldering the wire fixing portion and the suspension wire by irradiation of the protruding portion connected to the wire fixing portion by a laser beam.

8. The manufacturing method of the lens driving device according to claim 7,
wherein the wire fixing portion has a penetrated portion through which the suspension wire is passed.

9. The manufacturing method of the lens driving device according to claim 8, further comprising:
a wire insertion process of inserting the suspension wire through the penetrated portion, prior to the application process.

10. The manufacturing method of the lens driving device according to claim 8,
wherein an opening is formed in the protruding portion at a position adjacent to the wire fixing portion,
and wherein a portion of the protruding portion at a position inward from the opening is irradiated by the laser beam in the laser irradiation process.

11. The manufacturing method of the lens driving device according to claim 10, wherein a dimension from the opening to a tip of the protruding portion in the direction of protrusion is greater than a dimension between the penetrated portion and the opening.

12. The manufacturing method of the lens driving device according to claim 10,
wherein the opening is a through hole, where a dimension in an orthogonal direction orthogonal to the direction of protrusion of the protruding portion is greater than a dimension in the direction of protrusion,
and wherein a width dimension of the opening in the orthogonal direction is set to be greater than a width dimension between an edge of the protruding portion and an edge of the opening in the orthogonal direction.

13. The manufacturing method of the lens driving device according to claim 10,
wherein the upper leaf spring has a portion between the penetrated portion and the opening, a width thereof being narrower than a width of the protruding portion at a position inward from the opening.

* * * * *